United States Patent [19]

Jensen

[11] Patent Number: 6,065,000
[45] Date of Patent: *May 16, 2000

[54] COMPUTER-IMPLEMENTED PROCESS OF REPORTING INJURED WORKER INFORMATION

[75] Inventor: Mike Jensen, Newberg, Oreg.

[73] Assignee: Star Solutions & Consulting Services, Portland, Oreg.

[*] Notice: This patent issued on a continued prosecution application filed under 37 CFR 1.53(d), and is subject to the twenty year patent term provisions of 35 U.S.C. 154(a)(2).

[21] Appl. No.: 08/684,217

[22] Filed: Jul. 19, 1996

Related U.S. Application Data

[60] Provisional application No. 60/001,281, Jul. 19, 1995.

[51] Int. Cl.[7] ............................................... G06F 17/30
[52] U.S. Cl. .......................... 707/3; 707/4; 705/2; 705/4
[58] Field of Search ................................. 395/601, 605, 395/616, 203, 204; 707/3, 2, 4; 705/2, 4

[56] References Cited

U.S. PATENT DOCUMENTS

| | | | |
|---|---|---|---|
| 4,347,568 | 8/1982 | Giguere et al. | |
| 5,291,399 | 3/1994 | Chaco | 705/3 |
| 5,299,121 | 3/1994 | Brill et al. | 364/413.01 |
| 5,521,815 | 5/1996 | Rose, Jr. | 364/409 |
| 5,586,024 | 12/1996 | Shaibani | 364/413.02 |
| 5,664,112 | 9/1997 | Sturgeon et al. | 705/28 |
| 5,752,054 | 5/1998 | Garber et al. | 395/767 |
| 5,793,882 | 8/1998 | Piatek et al. | 382/115 |
| 5,884,275 | 3/1999 | Peterson et al. | 705/7 |

*Primary Examiner*—Jean R. Homere
*Attorney, Agent, or Firm*—Kolisch, Hartwell, Dickinson, McCormack & Heuser

[57] ABSTRACT

Predefined lists of selected variables are created and interrelated to produce incident reports. The lists are created and modified through the use of formatted computer screens or input forms, and the reports are produced through the use of formatted computer outputs or output formats. The lists include accident-related information such as industry types, occupations, safety teams, attendance codes, types of injuries, body parts affected, types of incidents, site conditions, accident causes and safety reminders. The input forms often correspond directly to the types of lists, so that there is a form through which the list of industry types is created and/or modified, and another form through which the list of occupations is created. In addition, there are input forms that allow creation and/or modification of several lists at one time, particularly when each element in one list is directly associated with one element from another list. The output formats include agency-related formats such as an OSHA (Occupational Safety & Health Administration) No. 200 report, and statistical summaries used for managerial decision making. The statistical summaries may be textual or graphical, or a combination of textual and graphical.

7 Claims, 63 Drawing Sheets

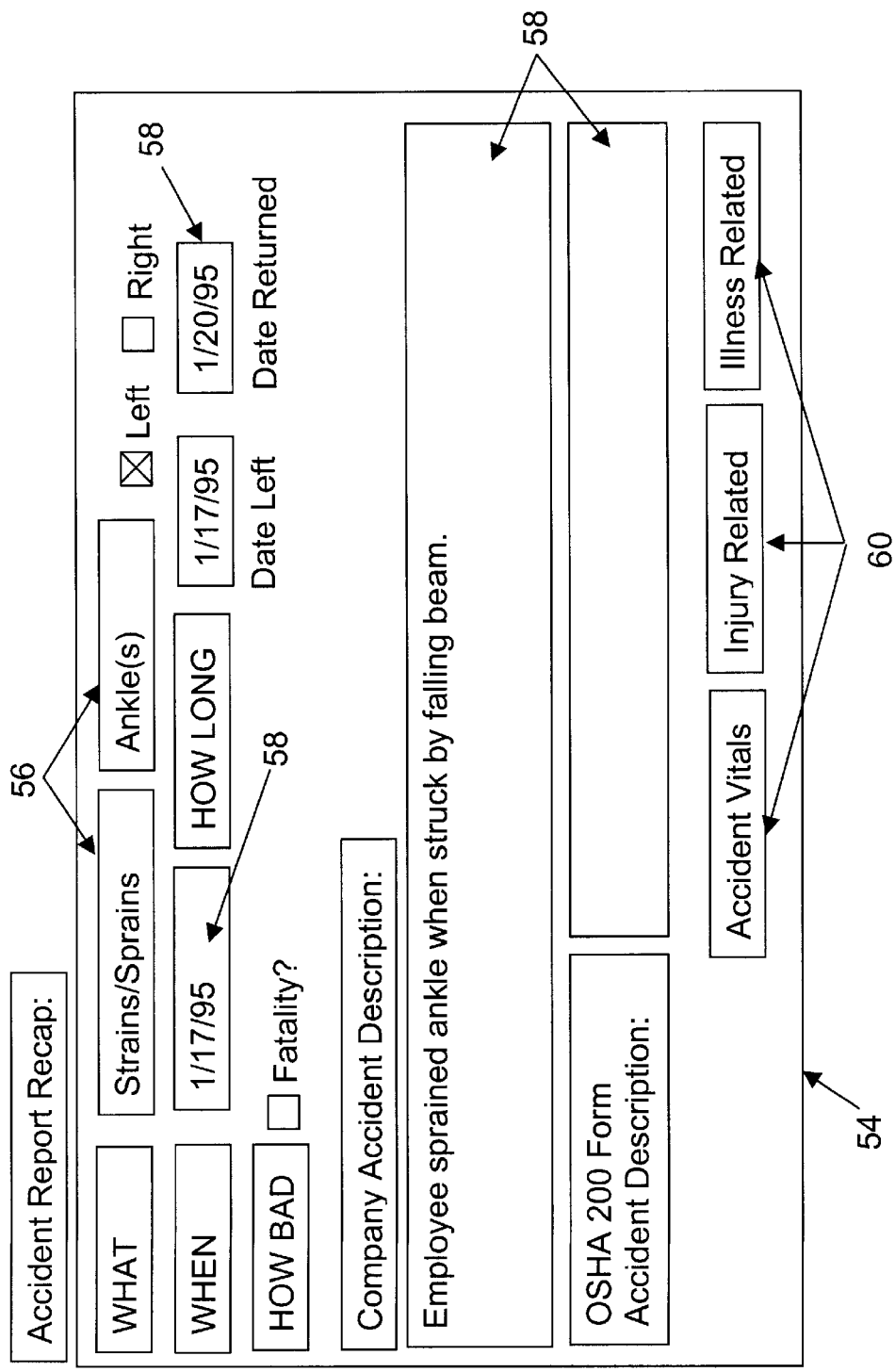

FIG. 4A

Bureau of Labor Statistics
Log and Summary of Occupational
Injuries and Illnesses

| | | | | | |
|---|---|---|---|---|---|
| NOTE: This form is required by Public Law 91-596 and must be kept in the establishment for *5 years*. Failure to maintain and post can result in the issuance of citations and assessments of penalties. (*See posting requirements on the other side of form.*) | | | | RECORDABLE CASES: You are required to record information about every occupational death, every nonfatal occupational illness, and those nonfatal occupational injuries which involve one or more of the following: loss of consciousness, restriction of work or motion, transfer to another job, or medical treatment (other than first aid). (*See definitions on the other side of form.*) | |
| Case or File Number | Date of Injury or Onset of Illness | Employee's Name | Occupation | Department | Description of Injury or Illness |
| Enter a nonduplicating number which will facilitate comparisons with supplementary records. | Enter Mo./day. | Enter first name or initial, middle initial, last name. | Enter regular job title, not activity employee was performing when injured or at onset of illness. In the absence of a formal title, enter a brief description of the employee's duties. | Enter department in which the employee is regularly employed or a description of normal workplace to which employee is assigned, even thought temporarily working in another department at the time of the injury or illness | Enter a brief description of the injury or illness and indicate the part or parts of body affected.<br><br>Typical entries for this column might be: Amputation of 1st joint right forefinger; Strain of lower back; Contact dermatitis on both hands; Electrocution—body. |
| (A) | (B) | (C) | (D) | (E) | (F) |
| | | | | | PREVIOUS PAGE TOTALS |
| | | | | | |
| | | | | | |
| | | | | | |
| | | | | | |
| | | | | | |
| | | | | | |
| | | | | | TOTALS (Instructions on other side of form) |

FIG. 4B

U.S. Department of Labor

OSHA Form 200

For Calendar Year 19 _____ Page _____ of _____

Form Approved
O.M.B. No 1220-0029

Company Name
Establishment Name
Establishment Address

| Extent of and Outcome of INJURY | | | | | Type, Extent of, and Outcome of ILLNESS | | | | | | | | |
|---|---|---|---|---|---|---|---|---|---|---|---|---|---|
| Fatalities | Nonfatal Injuries | | | | Type of Illness | | | | | | Fatalities | Nonfatal Illness | |
| Injury Related | Injuries With Lost Workdays | | | | Injuries Without Lost Workdays | CHECK Only One Column for Each Illness (See other side of form for terminations or permanent transfers.) | | | | | | Illness Related | Illnesses With Lost Workdays | | | Illnesses Without Lost Workdays |
| Enter DATE of death. Mo./day/ yr. | Enter a CHECK if injury involves days away from work, or days of restricted work activity, or both. | Enter a CHECK if injury involves days away from work | Enter number of DAYS away from work | Enter number of DAYS of restricted work activity. | Enter a CHECK if no entry was made in columns 1 or 2 but the injury is recordable as defined above. | Occupational skin diseases or disorders | Dust diseases of the lungs | Respiratory conditions due to toxic agents | Poisoning (systemic effects of toxic materials) | Disorders due to physical agents | Disorders associated with repeated trauma | All other occupational illnesses | Enter DATE of death. Mo./day/yr. | Enter a CHECK if illness involves days away from work, or days of restricted work activity, or both. | Enter a CHECK if illness involved days away from work. | Enter number of DAYS away from work. | Enter number of DAYS of restricted work activity. | Enter a CHECK if no entry was made in columns 8 or 9. |
| (1) | (2) | (3) | (4) | (5) | (6) | (a) | (b) | (c) | (d) | (e) | (f) | (g) | (8) | (9) | (10) | (11) | (12) | (13) |
| | | | | | | | | | | | | | | | | | | |
| | | | | | | | | | | | | | | | | | | |
| | | | | | | | | | | | | | | | | | | |
| | | | | | | | | | | | | | | | | | | |
| | | | | | | | | | | | | | | | | | | |
| | | | | | | | | | | | | | | | | | | |
| | | | | | | | | | | | | | | | | | | |

Certification of Annual Summary Totals By _____ Title _____ Date _____

OSHA No. 200   POST ONLY THIS PORTION OF THE LAST PAGE NO LATER THAN FEBRUARY 1.

FIG. 5
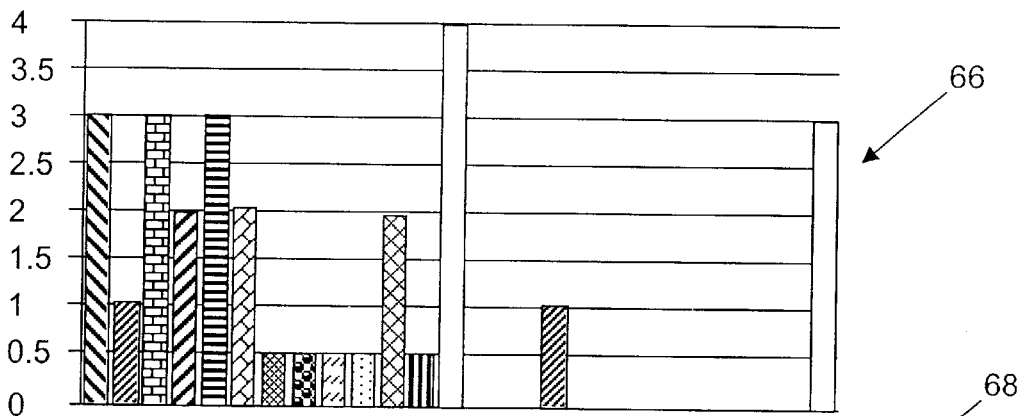
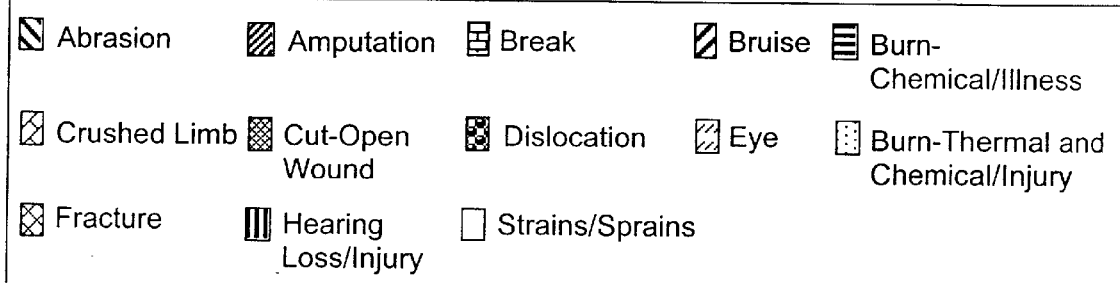

FIG. 7
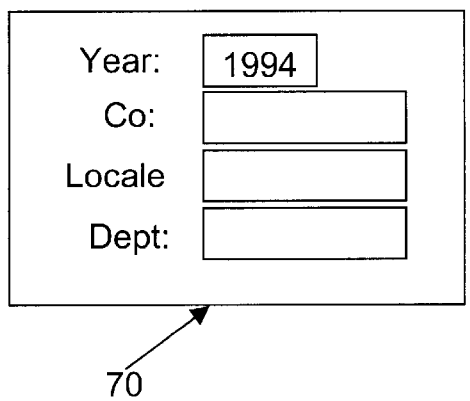
70
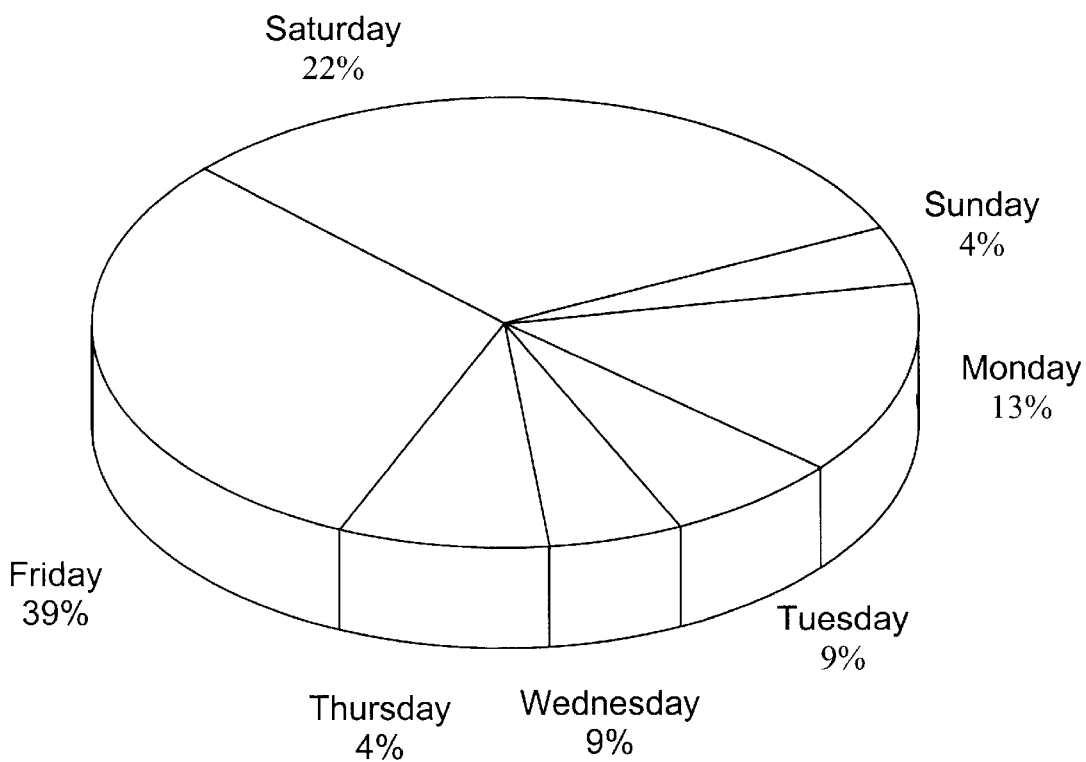
Accident Analysis – By Day of the Week

Fig. 9

SAFESTAR – Master List All
Participants (Alpha)

REPORT DATE: 11-JUL-95

Vital Statistics:

| NAME: | BOYNTON, SUSAN |
|---|---|
| ADDRESS: | 13201 NE 44TH STREET #14 |
| CITY/ST/ZIP: | VANCOUVER, WA 98682 |
| PHONE: | 206-896-9726 |

Employment Information:

| SOC. SEC. # | 540962944 |
|---|---|
| D.O.B.: | 8/3/64 |
| HIRED/LOE: | 5/12/76 - 19 YRS 2 MOS |
| DPT# NAME | 3 - TRUCKING |

Vital Statistics:

| NAME: | CHAISE, CHEVY |
|---|---|
| ADDRESS: | 499 FOX BLVD. |
| CITY/ST/ZIP: | HOLLYWOOD, CA 76004 |
| PHONE: | 310-655-7324 |

Employment Information:

| SOC. SEC. # | 545069823 |
|---|---|
| D.O.B.: | 5/17/47 |
| HIRED/LOE: | 4/11/78 - 17 YRS 3 MOS |
| DPT# NAME | 2 - OFFICE |

Vital Statistics:

| NAME: | GRANT, LOU |
|---|---|
| ADDRESS: | 497 WRITERS DR. |
| CITY/ST/ZIP: | PERIODICAL, NE 97640 |
| PHONE: | 402-555-2222 |

Employment Information:

| SOC. SEC. # | 789879742 |
|---|---|
| D.O.B.: | 12/2/40 |
| HIRED/LOE: | 6/14/90 - 5 YRS 1 MOS |
| DPT# NAME | 5 - RETAIL |

Vital Statistics:

| NAME: | JEFFERSON, GEORGE |
|---|---|
| ADDRESS: | 805 HIGH RISE BLVD |
| CITY/ST/ZIP: | NEW YORK, NY 80754 |
| PHONE: | 201-555-6890 |

Employment Information:

| SOC. SEC. # | 773901320 |
|---|---|
| D.O.B.: | 8/13/58 |
| HIRED/LOE: | 7/18/88 - 7 YRS 0 MOS |
| DPT# NAME | 1 - MANUFACTURING |

Accident Report Synopsis – By Period

Fig. 10

REPORT DATE: 11-JUL-95

Report Start    01-Jan-94      Report End    01-Jan-95

72

Month January

Department   1 - Manufacturing

| INJURY DATE | LAST NAME | FIRST | SSN | NATURE OF INJURY | ACCIDENT TYPE | LOE | TIME IN DEPT |
|---|---|---|---|---|---|---|---|
| 1/14/94 | KEATON | BUSTER | 813902231 | THERMAL & CHEMICAL | LOCK OUT / TA | 1 YRS-10 MOS | |

| ACCIDENT DESCRIPTION | WHEN A DOOR TO THEM MAIN FURNACE WAS OPENED ACCIDENTALLY, EMPLOYEE'S RIGHT ARM WAS BURNED WHEN THE FURNACE LOCK-OUT / TAG-OUT SWITCH FAILED TO ENGAGE. |
|---|---|
| CORRECTIVE ACTION TAKEN | HAVE SHUT DOWN THE FURNACE AND ORDERED REPAIRS MADE. ALSO, HAVE ADVISED EMPLOYEE OF CORRECT PROCEDURE. |

72

Month February

Department   1 - Manufacturing

| INJURY DATE | LAST NAME | FIRST | SSN | NATURE OF INJURY | ACCIDENT TYPE | LOE | TIME IN DEPT |
|---|---|---|---|---|---|---|---|
| 2/11/94 | JEFFERSON | GEORGE | 773901320 | RN-CHEMICAL/ILLN | HAZARDOUS M | 6 YRS-4 MOS | |

| ACCIDENT DESCRIPTION | EMPLOYEE BURNED ARM WITH ACID. |
|---|---|
| CORRECTIVE ACTION TAKEN | |

| INJURY DATE | LAST NAME | FIRST | SSN | NATURE OF INJURY | ACCIDENT TYPE | LOE | TIME IN DEPT |
|---|---|---|---|---|---|---|---|
| 2/11/94 | KEATON | BUSTER | 813902231 | HEARING LOSS/INJURY | HEARING PROT. | 2 YRS- MO | |

| ACCIDENT DESCRIPTION | EMPLOYEE RECEIVED HEARING INJURY DUE TO FAILURE TO WEAR HEARING PROTECTION PROPERLY. |
|---|---|
| CORRECTIVE ACTION TAKEN | HAVE ADVISED CORRECT PROCEDURE. |

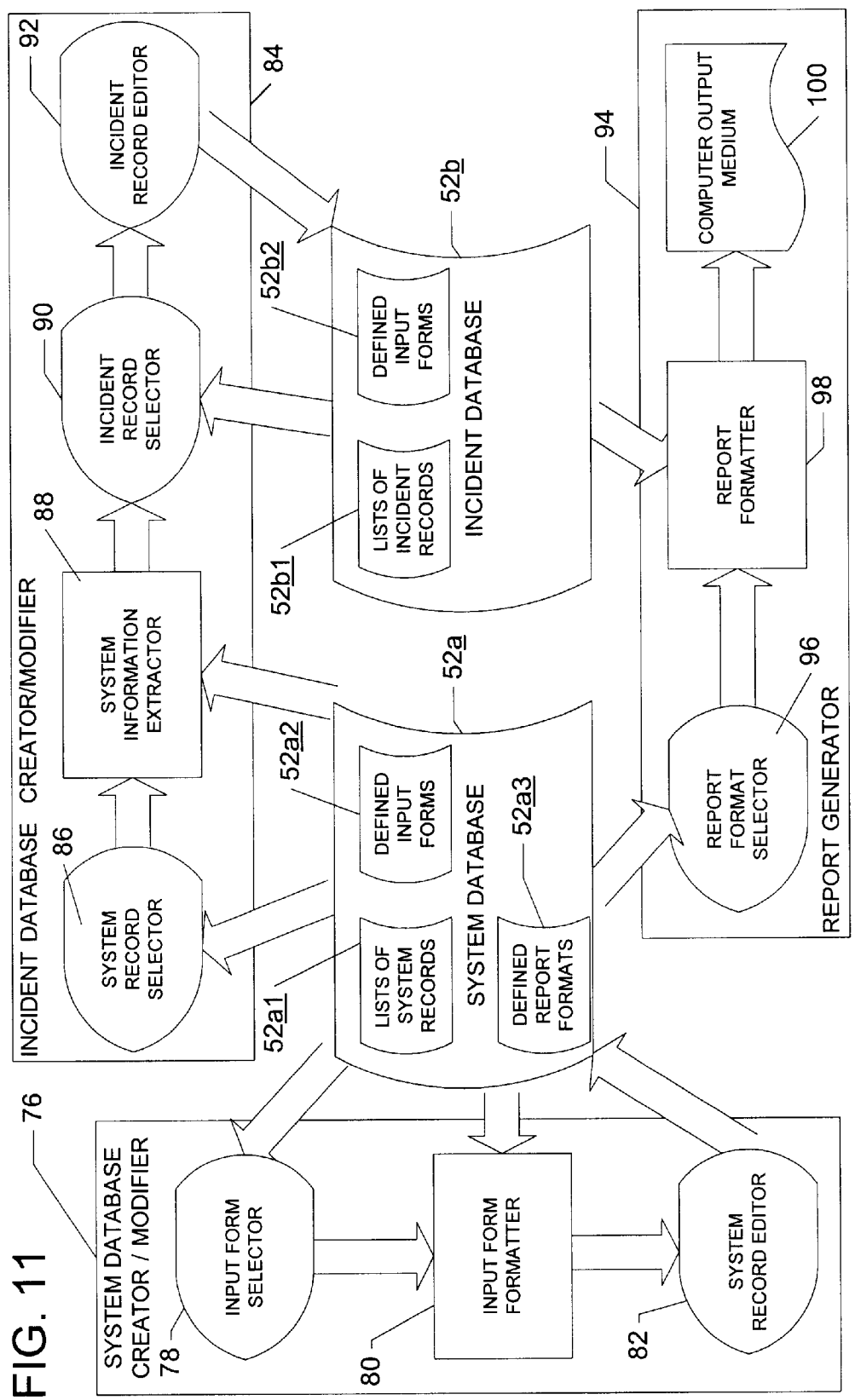

Fig. 18

Sign-On Permissions

LOOKUP: [___] ⇩ ◀ ▲ ▶ EDIT DELETE ADD CLOSE

Instructions: To Add/Modify/Delete a permissions record, follow these steps
Step #1: Sign-On ID= Any letter / number combination
  that identifies the user (required)
Step #2: Password = Any letter / number combination (no spaces) that acts as
  a secondary security level (e.g. dept. name, file name, etc.)
Step #3: Company = Select a specific company name from the list or leave
  the "*" if unlimited access is desired, (note: the "*" is the default
  value, if you want to restrict the records for this user to a specific
  company you will need to replace the "*" with a company name
Step #4: Level = Within a given company, Select a specific plant/location #
  from the list, or leave "*" if unlimited access is desired. (Same note
  applies as for the company. see Step #3)

| Sign-On ID | Password | Company | Level |
|---|---|---|---|
|  | * | * | * |
|  | * | * | * |

Master Password

Change Master Password

Fig. 23

Company Setup

[Save] [Close] [Add] [Open Dept. Setup Form] [Confiture Printer Now]

Company Name

Address

Address

City    ST    ZIP    County    Telephone

Locator #  999  State of Op:    Gen. Mgr. or Pres.

General Nature of Business:

Industry:    SIC Code:

Primary Hospital:    Of Record

[Page Down] Workers Comp. Insurance Info.    [Page Bottom] State Workers Comp. Division Info.

Fig. 24

Body Part - Entry Form

[EDIT] [ADD] [DELETE] [CLOSE]

| Body Part | Code |
|---|---|
| Abdomen (Includes Internal Organs) | 515 |
| Ankle(s) | 520 |
| Arm(s) | 507 |
| Back (lower, Mid, Upper) | 513 |

Fig. 28

|  | Counter |
|---|---|
| LAST | Text |
| FIRST | Text |
| SSN | Number |
| Birthday | Date/Time |
| LOE | Text |
| ADJ | Date/Time |
| Address | Text |
| City | Text |
| State | Text |
| Zip | Number |
| PHONE | Text |
| DEPT | Text |
| Dept Name | Text |
| Company | Text |
| Locale | Text |
| HrlyRate | Number |
| Occupation | Text |
|  | Text |

Fig. 25

Master Enrollment Form

LOOKUP: [ ] [◀◀][▲][▼][▶▶] [EDIT] [DELETE] [NEW] [CLOSE]

ID: [ ]

[ ⇩ ]
Company Name: [ ] Location: *Required Only for Network Installations*

Last: [ ] First: [ ] Social Security #: [ ] Date of Birth: [ ]

Address: [ ]

City: [ ] State: [ ] Zip: [ ] Phone Number: [ ]

[2 ⇩] Debit Code: [OFFICE] Dept. Name: [SUPERVISOR ⇩] Occupation: [$10.00] Hourly Rate [4/11/78] Date of Hire:

[5 ⇩] Team Code: [FALCONS] Team Name: *Complete if Safety Awareness Program will be used and based on "Team" Performance.* [6yrs. 11mos.] Length of Employment:

Fig. 26

ATTENTION! VERY IMPORTANT INFORMATION

You have selected the IMPORT function of the program.

In the event that you continue without completing all of the required steps and are exited out of the program, be assured that your data will not be lost. However, you will need to restart the program.

Note: You should invoke this function only if you have all of the information required and are ready to import the selected ASCII or Excel Spreadsheet file into the program.

In order for this process to be preformed successfully, the file you are preparing to import MUST BE in the EXACT column and date-type order as the Table you are importing into. If this is not done, unrepairable errors may occur and your imported data will not be complete, or may be imported into the incorrect fields of the Table [eg. Social Security # imported into the LAST name column.]

If you are unsure or need additional information, select the requested Table name and press the PRINT TEMPLATE button, before continuing Table Template Selection

| PRINT TEMPLATE | CANCEL | CONTINUE |

Fig. 27

Important Setup Parameters

Select the Source Type of the Data Being Imported
- ○ Text Delimited [ASCII]
- ○ Excel Spreadsheet
- ○ Lotus WKS file
- ○ Lotus WK1 [Version2]
- ○ Lotus WK3 [Versions 3 & 4]

Enter Full Path Name of Data to be Imported

Enter Name of Table to Import Data Into

Does the First Row Contain Field Names  ☐ YES  ☐ NO

Replace All of the Existing Records?  ☐ YES  ☐ NO

*Press CLOSE when the import function is completed. (The hour glass will disappear and the floppy drive light will go off.)*

OK    CLOSE

Fig. 30

Accident Form

RECORD LOOKUP: [⇩] [◀][▲][▼][▶] EDIT DELETE NEW CLOSE OVERRIDE   Accident #: 82

Vital Information

Emp. ID: 1234567 [⇩]   Soc. Sec. Number: 123-45-6789 [⇩]   Name Lookup:

Last: ____   First: ____

Sex: ☐ Male ☐ Female   Birthdate: ____

Address: ____

City: ____   State: ____   Zip: ____

Adj. Hire Date: 2/14/77   L.O.E.: 17 YRS. 8 MOS.   Company: 999   Location: ____   Phone Number: ____

Worker Occupation: JANITOR   Dept. #: 2   Department Name: OFFICE   Time in Dept.: ____

Team Code: 6   Team Name: BlueJays

[Page Down]   [Accident Specifics]   [Page Bottom]   [OSHA Info.]

Fig. 34

Accident Report - Advanced Information

Reference:

Primary Cause.
HORSEPLAY

Secondary Causes
Caught in, Under, Between

Summary:
Confined Space
Excessive Exposure

Primary Condition.
POOR LIGHTING

Secondary Conditions:
EXCESSIVE EXPOSURE

Summary:

Primary Witness.

Supplemental Witnesses:

Summary:

Return

Fig. 35

Employee Accident Description | If version does not differ from Co. Description, copy & paste from above Witness: [ ]

Date Co. Knew: [ ]

Street Address of Accident: [ ]

County of Injury: [ ]

Injured on Premises? ☒ YES ☐ NO

Injured While on the Job? ☒ YES ☐ NO ☐ UNKNOWN

Other Workers Injured? ☐ YES ☒ NO

Did someone else cause accident? ☐ YES ☒ NO

Was accident caused by failure of machinery or product? ☐ YES ☒ NO

Fatality? ☐ YES ☒ NO

Is worker an Owner of Officer? ☐ YES ☐ NO

Working Shift Start: [ ]  End: [ ]

Date Worker Left: [ ]

Time Worker Left: [ ]

Date Worker Returned: [ ]

Number Hrs. Per Shift: [ 8 ]

Days per week worked: 3 or Less ☐  4 ☐  5 ☐  6 ☐  7 ☐

Scheduled Days Off: S ☒ S ☒ M ☐ T ☐ W ☐ T ☐ F ☐

Wage: [ $9.00 ]  ☒ Hr. ☐ Wk. ☐ Yr.  ☐ Day ☐ Mo.

[Page Up]  [Accident Specifics]  [Page Top]  [Vital Statistics]  [Page Down]  [OSHA 200 LOG Entry]

Fig. 36

First Report of Injury - State Exceptions
In addition to the information already provided, your state also requires the following: [RETURN]

OSHA CASE #: [ ]  Employee Policy #: [ ]

Case #: [ ]  Was Salary Continued?: ☐ YES ☒ NO

Employee Class Code: [ ]

Value of other payments not recorded: [ ]  Paid full wages for day of Injury?: ☐ YES ☒ NO Gross Wages/Salary: [ ]

Employer Type: [ ]  If a fatality, what is the date of death?: [ ]

Hospital Address: [ ]
Physician's Address: [ ]

What was worker doing at the time of Injury?: [ ]  What equipment/material was the employee using during time of Injury?: [ ]

Fig. 39

| Injury Related | | | | | |
|---|---|---|---|---|---|
| | Nonfatal Injuries | | | | |
| Fatalities | | Injuries With Lost Work Days | | | Injuries Without Lost Workdays |
| Injury Related Enter DATE of death. Mo/da/yr | Enter a CHECK if injury involves days away from work, or days of restricted work activity or both. | Enter a CHECK if injury involves days away from work. | Enter number of DAYS away from work. | Enter number of DAYS of restricted work activity. | Enter a CHECK if no entry was made in columns 1 or 2 but the injury is recordable as defined above. |
| (1) | (2) | (3) | (4) | (5) | (6) |
| ☐ | ☐ | ☐ | ☐ | ☐ | ☐ |

| PAGE TOP | Vital Statistics | PAGE UP | OSHA 200 LOG Info. |

Fig. 40

| (7) Type of Illness | *Check only one column for each illness* | | | |
|---|---|---|---|---|
| Occupational Skin Diseases or Disorders ☐(a) | | | Disorders Due to Physical Agents ☐(e) | |
| Dust Diseases of the Lungs ☐(b) | | | Disorders Associated with Repeated Trauma ☐(f) | |
| Respiratory Conditions Due to Toxic Agents ☐(c) | | | All Other Occupational Illnesses ☐(g) | |
| Poisoning (systemic effects of toxic materials) ☐(d) | | | | |

| Illness Related | | | | |
|---|---|---|---|---|
| Fatalities | Nonfatal Illnesses | | | |
| | | Illness With Lost Work Days | | Illnesses Without Lost Workdays |
| Illness Related Enter DATE of death. Mo/da/yr | Enter a CHECK if illness involves days away from work, or days of restricted work activity or both. | Enter a CHECK if illness involves days away from work. | Enter number of DAYS away from work. | Enter number of DAYS of restricted work activity. | Enter a CHECK if no entry was made in columns 1 or 2 but the illness is recordable as defined above. |
| (8) | (9) | (10) | (11) | (12) | (13) |
| ☐ | ☐ | ☐ | ☐ | ☐ | ☐ |

Fig. 41

Advanced Accident Investigation:

RECORD LOOKUP: [ ] ⇩  [◀][▲][▼][▶]  [CLOSE]   Accident ID [ 86 ]

Report Overview

Enter any investigation report # [ 5342 ]

Name: [ ] [ ]   [ ] Company

10/17/94 Date:   SSN: [ ]   Trucking Dept. Name:

Location: [ ]   DOB: [ ]   6 months Time in Dept.   999 Locale:

☐ Male
☐ Female

Description [ Employee's right arm was amputated ]

Initial Report

| Nature | Date | C.Action | BodyPart | Incid.Type | Cause | P.Action | Acknowl. | Completed |
|--------|------|----------|----------|------------|-------|----------|----------|-----------|
|        |      |          |          |            |       |          |          |           |

Report Status

Incident Investigation    Investigation    Training & Special Info.

Fig. 42

Investigation Support

| | | COUNT | | | | COUNT |
|---|---|---|---|---|---|---|
| WHAT | Break | 4 | WHEN | 10/17/94 -AT- 8:00:00 a.m. | | 2 |
| WHERE | | 0 | CONDITION | Confined Space | | 12 |
| WHAT KIND | | 0 | HOW BAD? | FATALITY: ☐ HOSPITALIZED: ☒ | | |
| BODY PART | Arm(s) L☐ R☒ | 6 | OSHA status | FROI to be Filed?: ☐ | | |
| HOW LONG? | -TO- | | | 200 Log Recordable? ☐ | | |

Accident Description: Employee's right arm was amputated.

Corrective Action Description: Nothing.

Corrective Action Taken: 10/18/94

⇩

Probable Root Cause: Hazard

Report Overview

Training & Special Info.

Fig. 43

Training History

| Class Name | Class Date: | Re-Training: |
|---|---|---|
| Basic CPR | 1/16/95 | 5/16/95 |
| Basic CPR | 5/17/94 | 9/14/94 |
| Basic CPR | 6/14/94 | 10/12/94 |

Investigation Notes:
Employee determined to be incompetent.

Accident History

| Date | Nature of Injury | Body Part | Incident Type | Condition | Cause |
|---|---|---|---|---|---|
| 12/2/94 | Bruise | Ankle(s) | Struck By | Slippery Floor | Hazard |

Preventative Action Taken: Have changed policies re: accident procedures

Corrective Action Assigned to: _____ Date Completed: 1/15/09

Investigated By: _____

Performance Analysis

| 2 | 2 | 100.00% | |
|---|---|---|---|
| Co. Avg. | Acc total this | Individual | |
| #pp | Person | Performance | |

Report Overview

Advanced Investigation

Fig. 44

Accident Related Information
Date of Corrective Action Entry Review Form
|||Lookup: [____] ⬇ ⏮◀▲▶⏭ EDIT DELETE ADD CLOSE

| Date of Injury | Name | Nature & Type of Injury | Corrective Action Taken |
|---|---|---|---|
| 1/8/97 | Employee Name | Bruise | |
| | | Lock Out / Tag Out | |
| 6/11/92 | Employee Name | Asphyxiation | |
| | | Respiratory Protection | |
| 4/11/93 | Employee Name | Eye | |
| | | Eye Protection | |
| 1/14/94 | Employee Name | Thermal/Chemical Burn | Have shut down the furnaces and ordered repairs made. |
| | | Lock Out / Tag Out | |
| 2/11/94 | Employee Name | Burn - Chemical/Illness | |
| | | Hazardous Materials | |

Fig. 45

TRAFFIC ACCIDENT AND INSURANCE REPORT

Lookup: [  ]  Accident # [ 3 ]

[⇩] [◀◀][◀][▼][▲][▶] SAVE DELETE ADD CLOSE

REPORT DIRECTORY

Employee Lookup: [  ]
Employee Name and SS# [⇩]

Press to Sellect

VEHICLE #1    Driver    Vehicle Info
              Passengers    Insurance Info.

VEHICLE #2    Driver    Vehicle Info

If Accident involved someone outside of a motor vehicle, answer the following questions.

INFORMATION OTHER:    Name: [  ]
Involved Pedestrian ☐    Address
Involved Bicyclist ☐

Fig. 49

1ST Quarter
| January | February | March |
|---------|----------|-------|
| 0 | 0 | 0 |

[ OK ] [ Cancel ]

Fig. 46

Department Status Change - Quick Entry Screen

Lookup: [____] [⇩] [◄◄][◄][►][►►] [CLOSE]

| LAST | FIRST | SSN | DOB | HIRE | DEPT | Dept Name |
|---|---|---|---|---|---|---|
| Last-name | First-name | 123-45-6789 | 01/23/45 | 12/30/89 | 3 | Office |
| Last-name | First-name | 123-45-6789 | 01/23/45 | 12/30/89 | 3 | Office |
| Last-name | First-name | 123-45-6789 | 01/23/45 | 12/30/89 | 3 | Office |
| Last-name | First-name | 123-45-6789 | 01/23/45 | 12/30/89 | 3 | Office |
| Last-name | First-name | 123-45-6789 | 01/23/45 | 12/30/89 | 3 | Office |
| Last-name | First-name | 123-45-6789 | 01/23/45 | 12/30/89 | 3 | Office |

Fig. 47

Team Status Change - Quick Entry Screen

Lookup: [_____] ⇩ |◂ ▴ ▾ ▸| CLOSE

| LAST | FIRST | SSN | DOB | HIRE | CODE | Team Name |
|---|---|---|---|---|---|---|
| Last-name | First-name | 123-45-6789 | 01/23/45 | 12/30/89 | 4 | Eagles |
| Last-name | First-name | 123-45-6789 | 01/23/45 | 12/30/89 | 4 | Eagles |
| Last-name | First-name | 123-45-6789 | 01/23/45 | 12/30/89 | 4 | Eagles |
| Last-name | First-name | 123-45-6789 | 01/23/45 | 12/30/89 | 4 | Eagles |
| Last-name | First-name | 123-45-6789 | 01/23/45 | 12/30/89 | 4 | Eagles |
| Last-name | First-name | 123-45-6789 | 01/23/45 | 12/30/89 | 4 | Eagles |

Fig. 48

Monthly Safety Admin. - Hours Worked Entry Form

Year Lookup: [ ]  ⇩  [◀◀][◀][▲][▼]  [EDIT] [DELETE] [ADD] [CLOSE]

Company Name: [ ]

Plant Location#: [ 999 ]  ⇩

Submitted To: [ 1 ]

THIS REPORT COVERS THE FISCAL YEAR LISTED BELOW:

[ 1993 ]

Authorization / Routing

[ _____ ]  [ _____ ]  [ _____ ]
Production Manager:   Purchasing Manager:   General Manager:

Select Quarter

[ 1st Quarter ]  [ 2nd Quarter ]  [ 3rd Quarter ]  [ 4th Quarter ]

Fig. 50

S.O.S. Report Form

Lookup: [↓]     [|◄] [◄] [▲] [▼] [►|]     EDIT   DELETE   ADD   CLOSE   OVERRIDE

Report Basics:     Report ID [____] [↓]

Reported By:     Company Employee ☐   Non Employee ☐

If reported by a company employee, use the "name lookup"
box below, to select the person's name who is reporting Name Lookup: [_____] [↓]

[_____ Last _____]     [_____ First _____]

[Mail Stop / Location _____]     [Address _____]   [City ____]   [State __]   [Zip ____]   [Phone ____]

[Company ____]

Affected Persons  (If different than
above i.e. contractor, visitor, etc.): [_____]     [Page Down]   Incident Specifics

Fig. 51

| Incident Specifics | Date Observed: | Time: 10:00 A.M. |

Incident Location:

Incident Type: Faulty Floor or Surface

Conditions:

Incident Nature: Break

Witness:

Incident Description

Corrective Action Taken ☒Yes ☐No    *If Yes complete the following information*

Description:

Date Completed:

Did you involve your supervisor? ☐Yes ☐No  Their Name:

Is further action needed? ☒Yes ☐No  If Yes, suggestions:

Page Up

Report Basics

Fig. 52

S.O.S. Investigation

Lookup: [_____] [⇨] [▼][▲][▲][▼] [CLOSE]

Report Overview

Report ID [ 1005 ]

Submitted By:

☐ Company Employee  ☐ Non Employee

| Name | Mail Stop / Location | Address | City | State | Zip |

Affected Persons: [_____]

Description: [_____]

Report Status

Initial Report

| Nature | Date | C.Action | Supvr. | Action Nd. |

Investigation

| Cause | P.Action | Acknowl. | Completed |

[ Incident Investigation ]  [ Action & Response ]

Fig. 53

Training - Enrollment Form

Class Lookup: [ ▼ ]  [EDIT] [DELETE] [ADD] [CLOSE]

SUBJECT: Basic CPR Technique Training

CODE: CPR 101   CASS NAME: Basic CPR

Date: 5/17/94   Instructor:

Location:   Test ID: Advanced CPR [▼]

Re-Training Interval: Four Months [▼]

>>Next Date:   Create New Date:
<<Prev. Date:

Attendees:

| Name Lookup | Last | Last | Dept. Name | Company |
|---|---|---|---|---|
| Full Name - SSN | Last Name | First Name | Office | Company Name |
| Full Name - SSN | Last Name | First Name | Office | Company Name |
| Full Name - SSN | Last Name | First Name | Office | Company Name |
| Full Name - SSN | Last Name | First Name | Office | Company Name |

Record: 1

Fig. 54

RE-TRAINING - Enrollment Form

Class Lookup: [ ] CLOSE

| CODE: | CLASS NAME: | SUBJECT: | Re-Training Interval: |
|---|---|---|---|
| CPR 101 | Basic CPR | Basic CPR Technique Training | Four Months |

Date: 4/1/94

Instructor: [ ]

Location: [ ]

Test ID: [ ]

>>Next Date:  
<<Prev. Date:  
Create New Date:

Attendees:

Name Lookup

| Last | Last | Dept. Name | Company |
|---|---|---|---|

Record: 1

Fig. 55

Create or
Modify a test

Locate a Specific Test

[▽] or [New]

Test Name  [Advanced CPR]

Test Subject  [Advanced CPR Training]

Question: [When performing CPR, what is the correct ratio of "breaths" to "beats?"] ▼   Points [10]   Type [B]

[Previous Question]
[Next Question]

ANSWERS
○ A. 5 breaths to 2 beats
◉ B. 2 breaths to 5 beats
○ A. 4 breaths to 3 beats

Fig. 56

Score a Test

Session ID: CPR 101 ▼
Test: Advanced CPR ▼
Student: ▼

[Go to Test Entry Screen]
[Close]

| Number | Answer | Score | Question | Correct Responses |
|--------|--------|-------|----------|-------------------|
| 1 | 2 | 10 | When performing CPR, what is the | (2 10) B,2 breaths to 5 Beats |
| 2 | 1 | 0 | Before performing CPR, you should | (2 10) FALSE |
| 3 | 1 | 10 | You should open a victim's mouth | (1 10) TRUE |
| 4 | 1 | 10 | How long should you continue the | (1 10) A - Until professional m |
| 0 | 1 | | | |

4 Questions | 30 Points Total

Fig. 57

Test Question Summary

Test: Advanced CPR

Advanced CPR Training

Modify This Test    Close

| # | Question | Answer | Points |
|---|---|---|---|
| 1 | When performing CPR, what is the correct ratio of for "b | B. 2 breaths to 5 Beats | 10 |
| 2 | Before performing CPR, you should move the person | FALSE | 10 |
| 3 | You should open a victim's mouth and check for obstruct | TRUE | 10 |
| 4 | How long should you continue the procedure once it i | A. Until professional medical | 10 |

Fig. 58

Cost of Accident

Lookup: [▽] [|◁ ◁ ▲ ▷|] [CLOSE]

Vital Information

Last: [ ]  First: [ ]

Accident Report Recap:

[5/14/47] Date of Birth: [ ] Soc. Sec. #:

[10/17/94] Date of Injury  [Break] Nature of Injury  [Arm(s)] Body Part  [Lock Out / Tag Out] Accident Type  [☐] Fatality?

Description: [Employee's right arm was amputated.]

Accident Costs:

Direct Medical Costs: [$500.00]
Compensation Costs: [$100.00]
Administration Costs: [$120.00]
Initial Accident Costs: [$720.00]
Estimated Reserves: [$2,000.00]

Fig. 59

Worker's Compensation Analysis - Setup Form

CLOSE

Name of Primary Product: Plastics

Avg. Retail Cost per Unit: $15,000.00

Avg. % of Profit per Unit: 20.00%

Mfg. Days Req. per Unit: 1

Record: 1

Fig. 60

Advanced Tracking - Entry Screen

LOOKUP: [↓]  [|◄] [◄] [▼] [►|]  [EDIT] [DELETE] [ADD] [CLOSE]

Soc. Sec. Number: [↓]      Name Lookup: [         ↓]

[_____]  [_____]  [7/1/77]  [17yrs-3mos]  [     5    ]  [  Retail  ]
   Last         First    Adj. Hire Date:  L.O.E.:   Dept. #:   Dept. Name:

Date Absent: [1/13/94]  Date Returned: [1/28/94]  Absence Code: [Unexcused ↓]

Corrective Action [X]   Corrective    [Associate placed on notice of suspension
Required?               Action Taken:  of privileges                          ]

Fig. 61

OSHA 200 Information

Record Lookup: [ ]  ⬇  ⏮ ◀ ▲ ▼ ⏭  CLOSE  DELETE

Enter a Case Number: [ ]

Vital Information

Name: [ ]

Date of Birth: 5/17/47    Soc. Sec. #: [ ]    Date of Injury: 12/2/94

Date of Hire: 6/18/81    L.O.E.: 13yrs - 6mos    Department: 5    Dept. Name: Retail Time in Dept: [ ]    Occupation: Supervisor Accident Recap    Injury Related    Illness Related

Fig. 62

Accident Report Recap:

| WHAT | Fracture | Wrist(s) | ☐ LEFT | ☒ RIGHT |

| WHEN | 12/17/94 | HOW LONG | | |

Date Left:   Date Returned:

HOW BAD   ☐ FATALITY?

Company Accident Description

Enter a Unique Case Number:

Push to enter info in Correct Category

[Injury Related]   [Illness Related]

OSHA 200 Form Accident Description

[PAGE TOP]  Vital Statistics    [PAGE UP]  FROI & OSHA Info.

Fig. 66

OSHA - First Report of Injury

Select Accident File

CONFIRMATION

Last Name                Date of Injury

OPTIONS

[Print Preview]   [Print]   [CANCEL]

Fig. 63

| Injury Related | | | | | |
|---|---|---|---|---|---|
| | Nonfatal Injuries | | | | |
| Fatalities | | Injuries With Lost Work Days | | | Injuries Without Lost Workdays |
| Injury Related Enter DATE of death. Mo/da/yr | Enter a CHECK if injury involves days away from work, or days of restricted work activity or both. | Enter a CHECK if injury involves days away from work. | Enter number of DAYS away from work. | Enter number of DAYS of restricted work activity. | Enter a CHECK if no entry was made in columns 1 or 2 but the injury is recordable as defined above. |
| (1) | (2) | (3) | (4) | (5) | (6) |
| ☐ | ☐ | ☐ | 0 | ☐ | ☐ |

| PAGE TOP | Vital Statistics | PAGE UP | OSHA 200 LOG Info. |

Fig. 64

Accident Report by Period

Report Period

Enter the report START and END dates

START      END

To further customize your report, one or all of the following may be selected

Company
Division / Plant
Department

Related Categories

Select report data criteria from any or all of the below listed categories

Nature of Injury
Accident Type
Cause
Condition
Body Part

OPTIONS

Print Preview    Print    CANCEL

Fig. 65

Accident Analysis - Parameter Defined

Report Period

Enter the report START and END dates

START  END

To further customize your report, one or all of the following may be selected

Company
Division / Plant
Department

Related Categories

Select report data criteria from any or all of the below listed categories

Nature of Injury
Accident Type
Cause
Condition
Body Part

OPTIONS

Print Preview    Print    CANCEL

Fig. 67

Enter Year To Be Processed

To further customize your OSHA 200 Log one or all of the following may be selected:

| Company | |
| Division / Plant | |
| Department | |

Print Preview | Print | CANCEL

Fig. 68

OSHA Year End Questionnaire

Enter Year To Process

Enter Starting Month:     Enter Ending Month:

Starting Day:     Ending Day:

Optional. If left blank, all days will be displayed

OPTIONS

Print Preview     Print     CANCEL

Fig. 70

Accident Related Graphs

Enter Year to Process [ ] -to- [ ]

Press to Select Multi-Yr Comparisons

Option:
- Preview
- Print
- Design

Description:

○ Nature of Injury
○ PCT By Dept.

To further customize your graphs, one or all of the following may be selected
- Company →
- Division / Plant →
- Department →

Select Graph to Open:
○ Accident Reminders
○ Body Parts
○ Condition Type
○ Costs / Hi to Lo
○ Departments
○ Freq. By Day of the Week
○ Freq. By Time of the Day
○ Incident Types
○ Injuries Avg. Cost
○ Monthly Totals

Fig. 71

MASTER COST ANALYSIS

Report Period

Enter the report START and END dates

START   END

Related Categories

Select report data criteria from any or all of the below listed categories

- Nature of Injury
- Accident Type
- Cause
- Condition
- Body Part

To further customize your report, one or all of the following may be selected

- Company
- Division / Plant
- Department

OPTIONS

Print Preview    Print    CANCEL

COMPUTER-IMPLEMENTED PROCESS OF REPORTING INJURED WORKER INFORMATION

CROSS-REFERENCE TO RELATED APPLICATIONS

This application claims priority from U.S. Provisional Patent Application Serial No. 60/001,281 entitled "INCIDENT REPORTING SYSTEM" filed on Jul. 19, 1995.

TECHNICAL FIELD

This invention relates generally to the organization, coordination and presentation of data related to workplace incidents such as accidents resulting in worker injuries. For example, the invention includes a method of prompting a user for information about the workplace such as employee identification, accident and injury classification, and educational and precautionary actions to be taken. The invention also includes a method of prompting a user for information necessary to complete accident reports of the type required by federal, state and local agencies, and reports useful for making managerial decisions about the workplace. The recording and reporting of statistics about such incidents is both necessary to comply with governmental regulations, and useful to evaluate and improve workplace safety. The present invention provides a system for the administration and support of the industry process known as light duty/restricted duty/recurrence of injury recording, analysis and reporting.

BACKGROUND ART

In the past, a myriad of paper and paperless forms have been developed and used to aid in this process. For example, OSHA (Occupational Safety & Health Administration) form No. 200 is a fill-in-the-blanks form, with blanks for specific information about a given accident, such as the name of the injured, the type of injury, the severity of the injury and the extent of any resulting absence from work. While it is relatively simple for a user to complete the form, only the most experienced user is able to complete the form with any type of standardization. Furthermore, it is difficult to coordinate such standardization among disparate users, as is desirable in a large, multi-plant workplace. Computer databases have also been used to track employee information and accident statistics. However, no method has, prior to the present invention, interrelated predefined lists of the possible variables used in accident reporting to repeatably produce consistent accident reports, nor has any previously done so using a plurality of defined lists of such variables stored on a computer.

DISCLOSURE OF THE INVENTION

The present invention includes predefined lists of selected variables, the methods of creating and interrelating such lists, and the methods of using such lists to produce incident reports. The lists are created and modified through the use of formatted computer screens, referred to herein as input forms, and the reports are produced through the use of formatted computer outputs, referred to herein as output formats. The lists include accident-related information such as industry types, occupations, safety teams, attendance codes, types of injuries, body parts affected, types of incidents, site conditions, accident causes and safety reminders. The input forms often correspond directly to the types of lists, so that there is a form through which the list of industry types is created and/or modified, and another form through which the list of occupations is created. In addition, there are input forms that allow creation and/or modification of several lists at one time, particularly when each element in one list is directly associated with one element from another list. The output formats include agency-related formats such as the OSHA 200 report discussed above, and statistical summaries used for managerial decision making. The statistical summaries may be textual or graphical, or a combination of textual and graphical.

BRIEF DESCRIPTION OF THE DRAWINGS

FIG. 3. is an example of a form through which information is added to a list as part of the present invention;

FIGS. 4A–4B is an example of an OSHA 200 form produced by the present invention;

FIG. 5. is an example of a graphical accident analysis by nature of injury, produced by the present invention;

FIG. 7. is an example of a graphical accident analysis by day of the week, produced by the present invention;

FIG. 8. is an example of a textual/graphical accident analysis showing the status of accident investigations, produced by the present invention;

FIG. 9. is an example of a textual report showing the vital statistics for employees, produced by the present invention;

FIG. 10. is an example of a textual accident analysis listing a synopsis of each accident by period, produced by the present invention; and FIG. 11. is a data flow diagram of the present invention.

FIGS. 12–71 are illustrations from the operating instructions of a preferred embodiment of the invention.

DETAILED DESCRIPTION OF THE PREFERRED EMBODIMENTS

Figure 1:
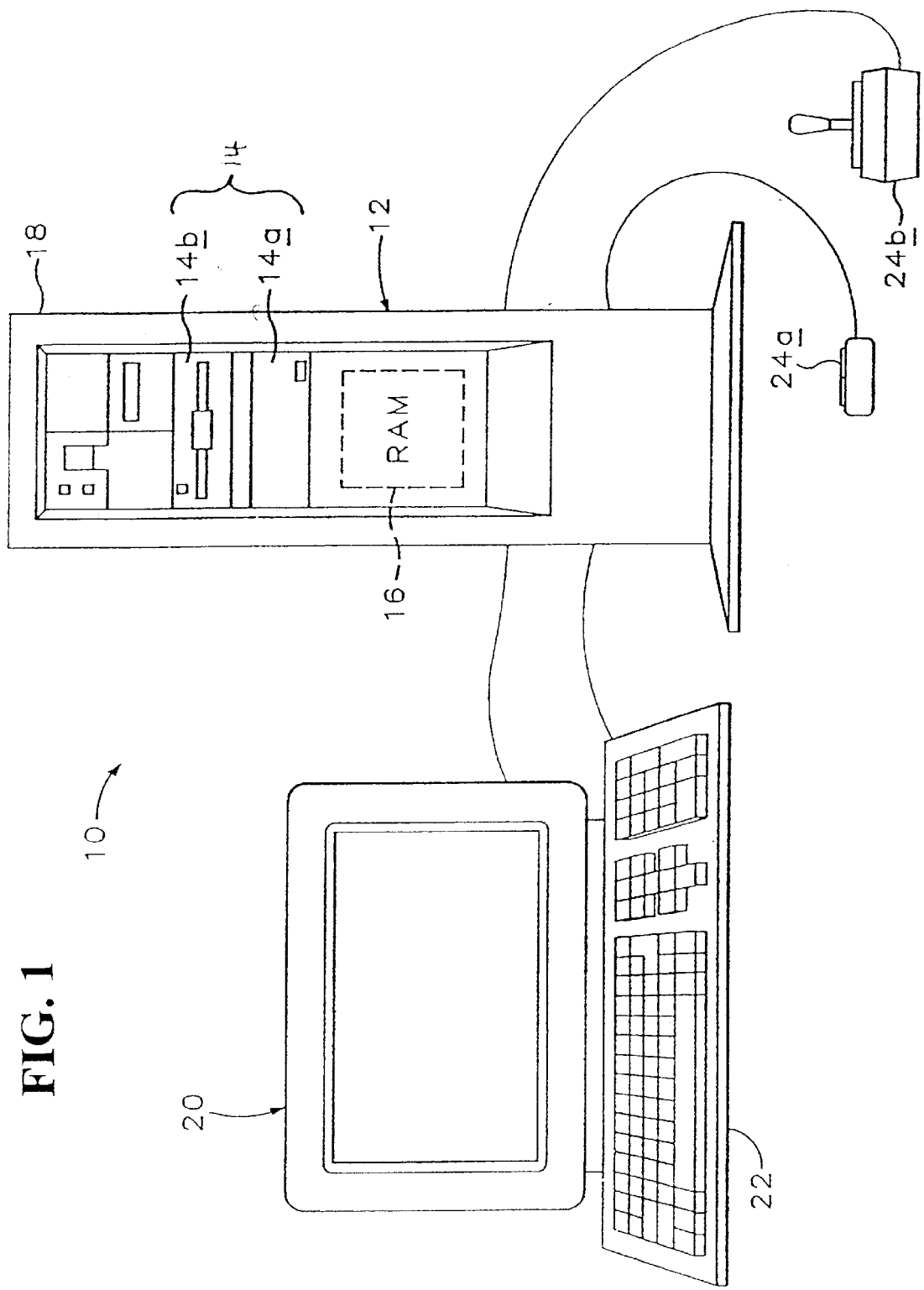
FIG. 1. is a conventional user workstation that may act as a hardware/firmware platform for the software of the present invention, including an accident reporting system and invented method and apparatus which forms a part thereof.

Referring first to FIG. 1, a user workstation is shown generally at 10, including a general-purpose computer typically providing a digital processor 12 containing an arithmetic logic unit (ALU) and various registers typically including register stacks, scratchpad memories and accumulators. Skilled persons also will appreciate that the workstation also typically will provide computer memory such as mass data storage 14, e.g. a hard or flex disk drive 14a, 14b, or both, as well as a quantity of read-and-write semiconductor memory (RAM) 16 (shown in outline as residing within workstation 10 and its housing 18) in which application programs reside for execution by processor 12. Finally, skilled persons will appreciate that the workstation also typically will provide one or more user interfaces or display mediums such as a video display terminal (VDT) 20, a keyboard 22 and an associated display cursor control system 24 including, for example, a mouse or joystick 24a, 24b, or both. In addition to disk drives 14a and b, RAM 16 and VDT 20, other computer output mediums might be included such as printers, communication networks or other storage devices. All such conventional hardware, firmware and software-executing-on-a-hardware/firmware platform architectures for the accident report system of the present invention are contemplated, and all are within the spirit and scope of the present invention.

Figure 2:
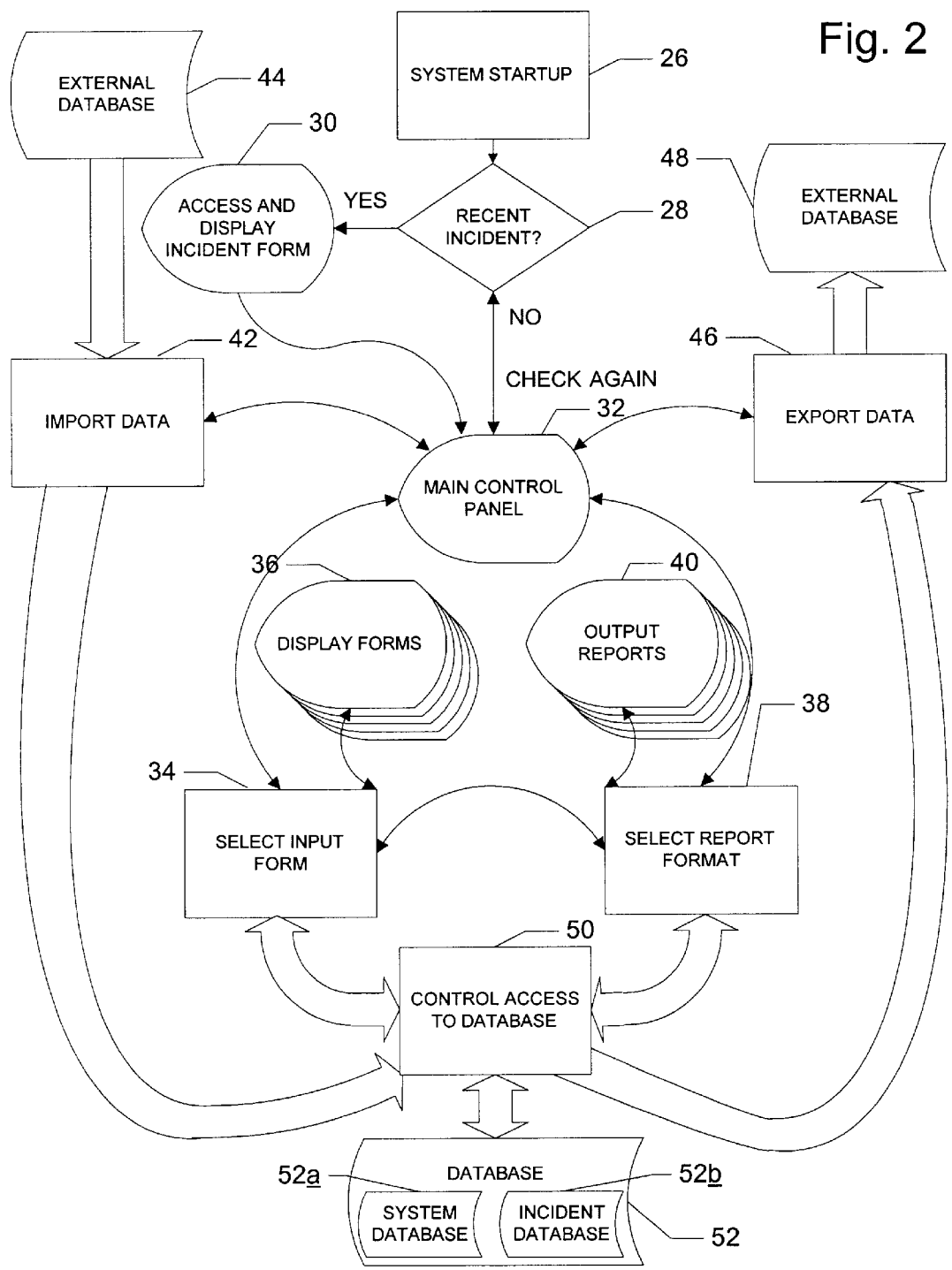
FIG. 2. is a control flow diagram of the software of the present invention.

Referring now to FIG. 2, a highly simplified control flow diagram is shown of the software executed on user workstation(s) 10 of the present system. The software is preferably stored on mass data storage device 14, then loaded into RAM 16 by digital processor 12. The represented steps of displaying control panels, forms and reports are logical displays, generated by digital processor(s) 12 on one or more VDTs 20 at one or more user workstations 10. The user would then be able to review the information on VDTs 20 and modify the database(s) stored on mass storage device(s) 14. This is done through the use of input devices like keyboards 22 or display cursor control systems 24.

A step of system startup 26 includes a verification of database integrity by determining if any other users currently are attached to the database, and to verify that all required elements of the database are available. After startup 26, there is a check to determine if any recent incidents have occurred, at 28. If such an incident has occurred, then the incident form is accessed and displayed at 30. If there is no recent incident, or if review of such a recent incident is completed, control is then transferred to the main control panel 32, another logical display operated on by the user through keyboards 22 or display cursor control systems 24.

One option at control panel 32 is to check again to determine if there are any recent incidents by returning to step 28. A second option is to direct the operation of the program to selecting an input form, at 34. Once such an input form has been selected, it is displayed at 36. When the user is done reviewing the displayed form, another input form may be selected at 34. Alternatively, there is a return to the main control panel at 32.

A third option from the main control panel is to direct control to selecting a report format, at 38. A selected report format is displayed as indicated at 40, after which control is returned to selecting a report format at 38. As with selecting an input form at 34, control can now be returned to the main control panel at 32.

Cross-transfer of control is available from selecting an input format 32 directly to selecting a report format at 38, and vice versa, as shown.

A fourth transfer available from the main control panel at 32 is to import data at 42, from external databases, at 44. Similarly, control can be transferred from the main control panel at 32 to export data at 46, to external databases, at 48.

Each of the above steps usually requires access at 50 to the internal database(s) 52. This access is controlled to ensure system data integrity and confidentiality. Database 52 is preferably stored on mass storage devices 14 that are controlled and accessed through a single digital processor 12, with the step of controlling access being performed by this processor 12. Processor 12 may in turn be connected to other user work stations 10, for example through a local area network (LAN), a wide area network (WAN) or a modem.

For reference, database 52 could include a system database containing lists of entries or records that might be selected to describe any given incident, an incident database containing lists of records that describe specific incidents, or both. The system database might also be referred to as a company database, particularly when the database has been customized for a particular company. For example, database 52 might include information on the company address, parents or subsidiaries, employees or specific types of incidents expected in the company's operations.

Referring now to FIG. 3, a sample input form is shown, including a screen image 54. Within screen image 54 there are insert-from-list fields at 56, which when selected with cursor control system 24 present a defined list of selectable variables from the system database. Cursor control 24 can then be operated to select one of such variables and to enter the selected variable into field 56. Next, there are direct-entry fields 58, into which the user inserts the requested information, using, for example, keyboard 22. Fields 56 may also provide for such direct entry of information. Screen image 54 further includes one or more control buttons 60, the selection of which, using cursor control 24, transfers control from the displayed form to a different form, report or control panel. Exiting screen image 54 causes the added or modified information from fields 56 and 58 to be written to incident database 52b.

An example of a completed OSHA 200 report is shown in FIG. 4. This report includes numerous rows 62 and columns 64 of information. The rows represent a record for a single incident, and the columns represent selected elements or entries from such records.

Figure 6:
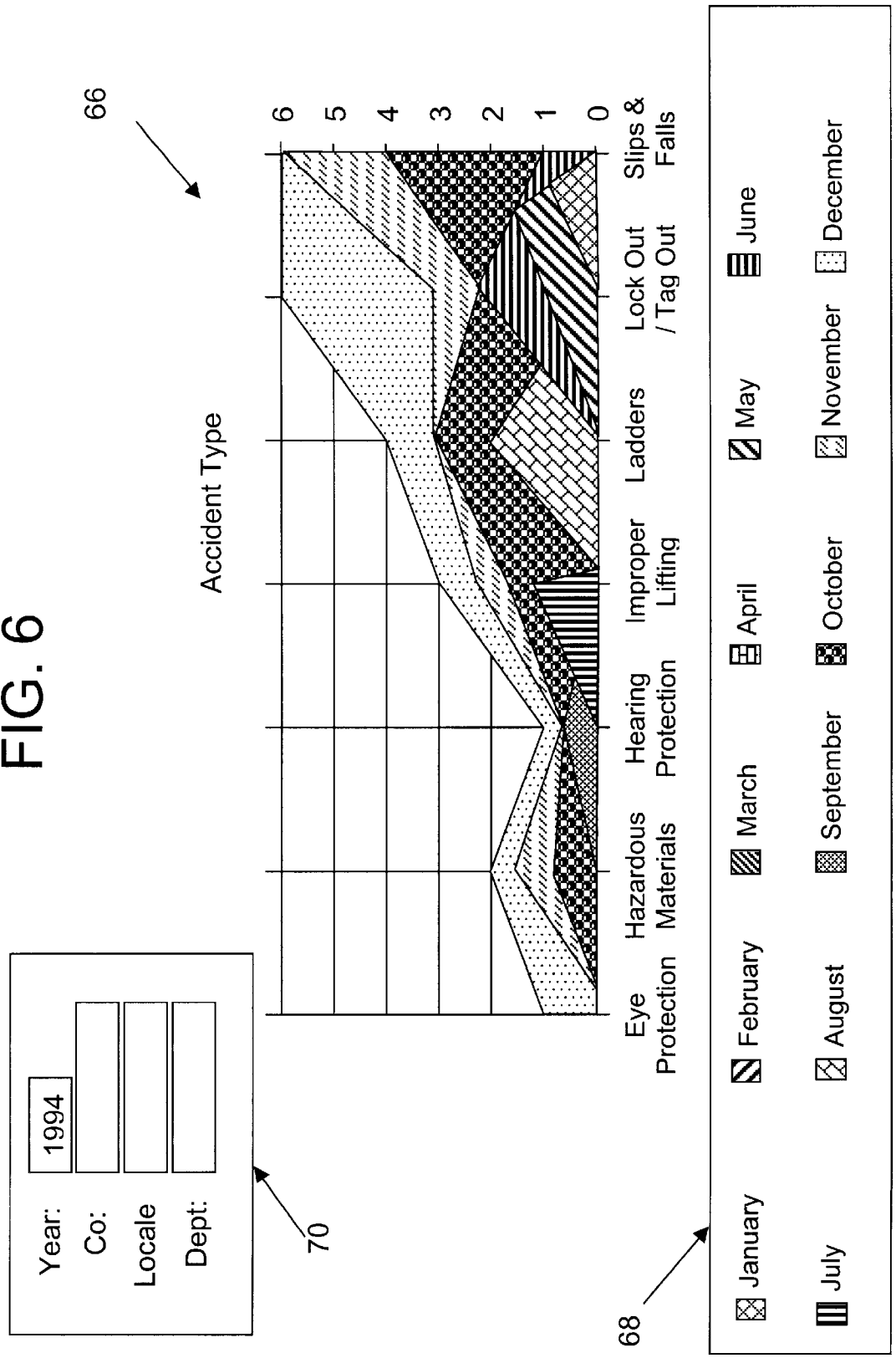
FIG. 6. is an example of a graphical accident analysis by type of accident, produced by the present invention.
Figure 15:
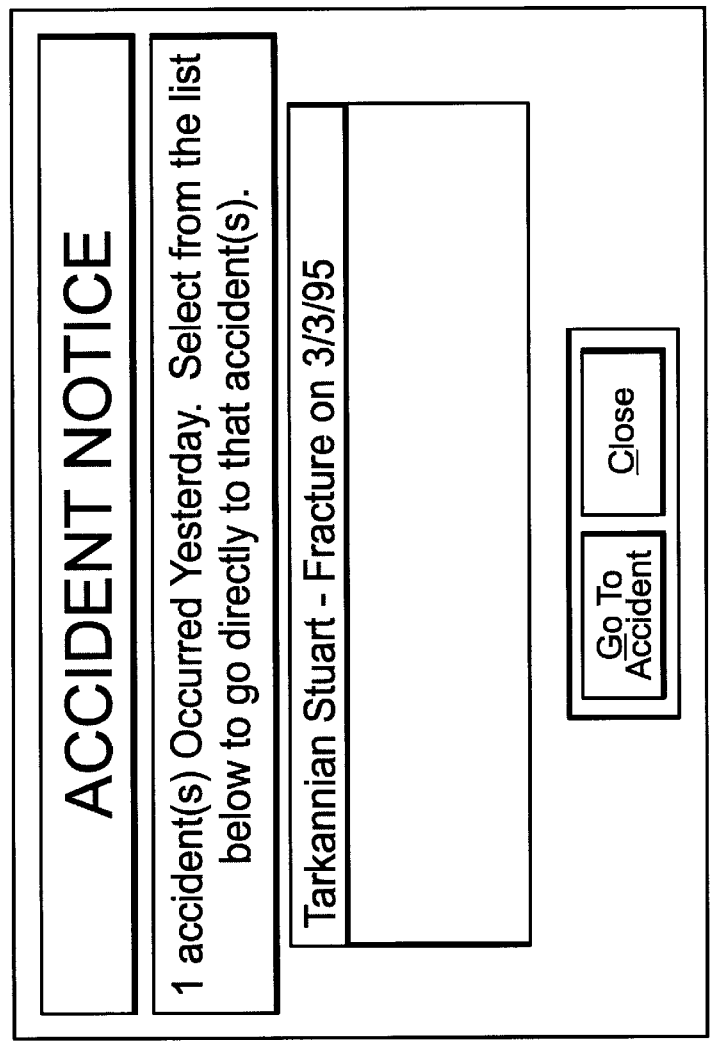
Figure 12:
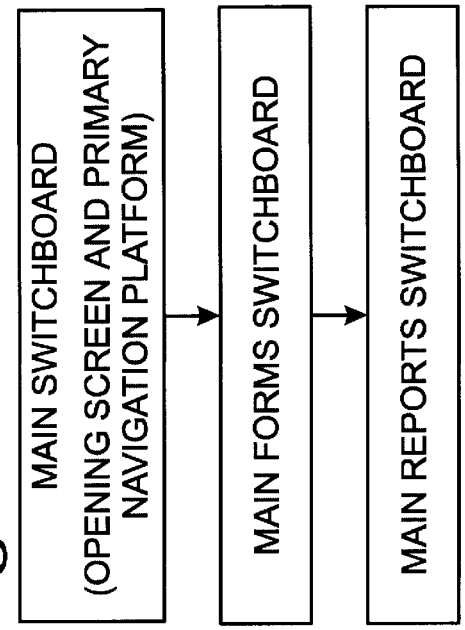
Figure 13:
Figure 14:
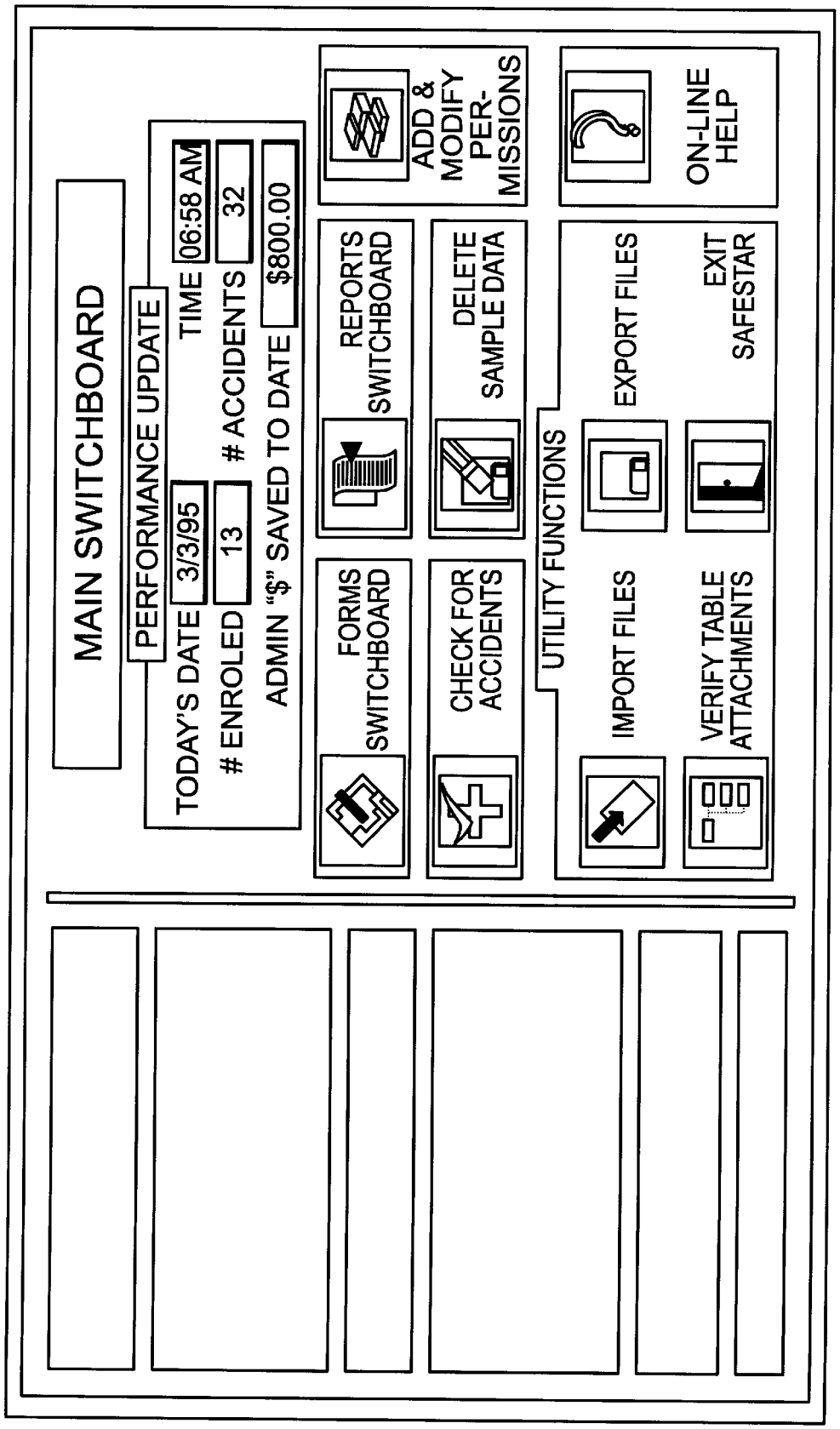
Figure 16:
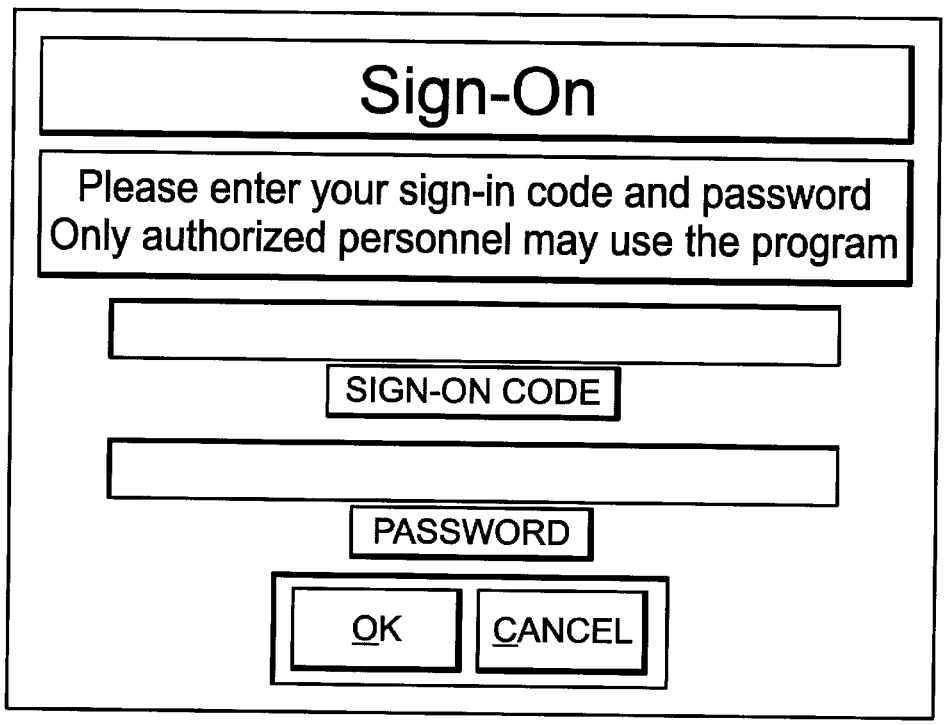
Figure 17:
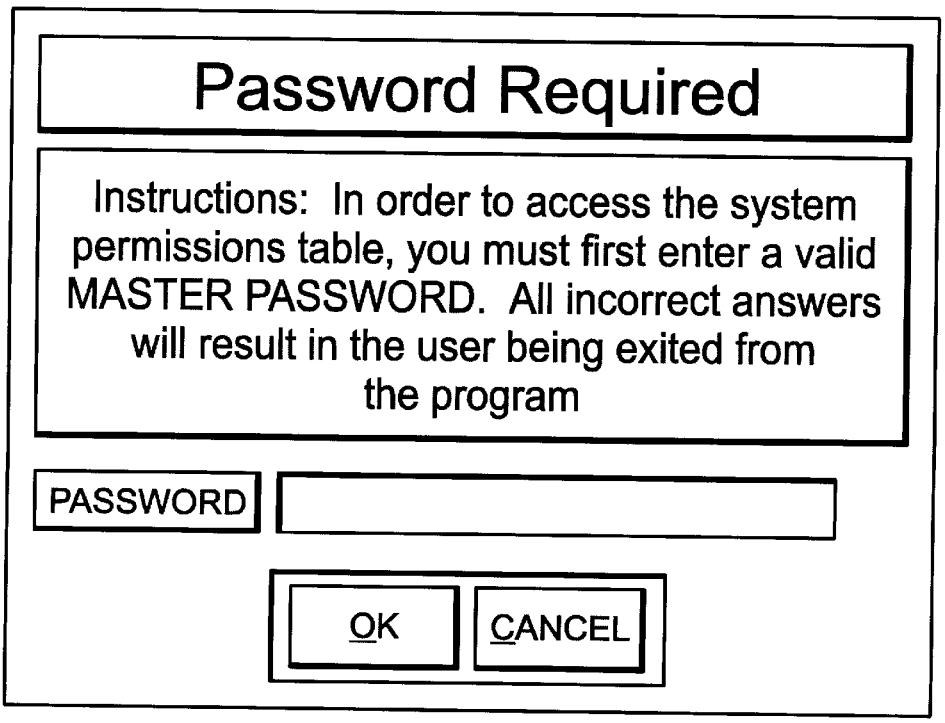
Figure 19:
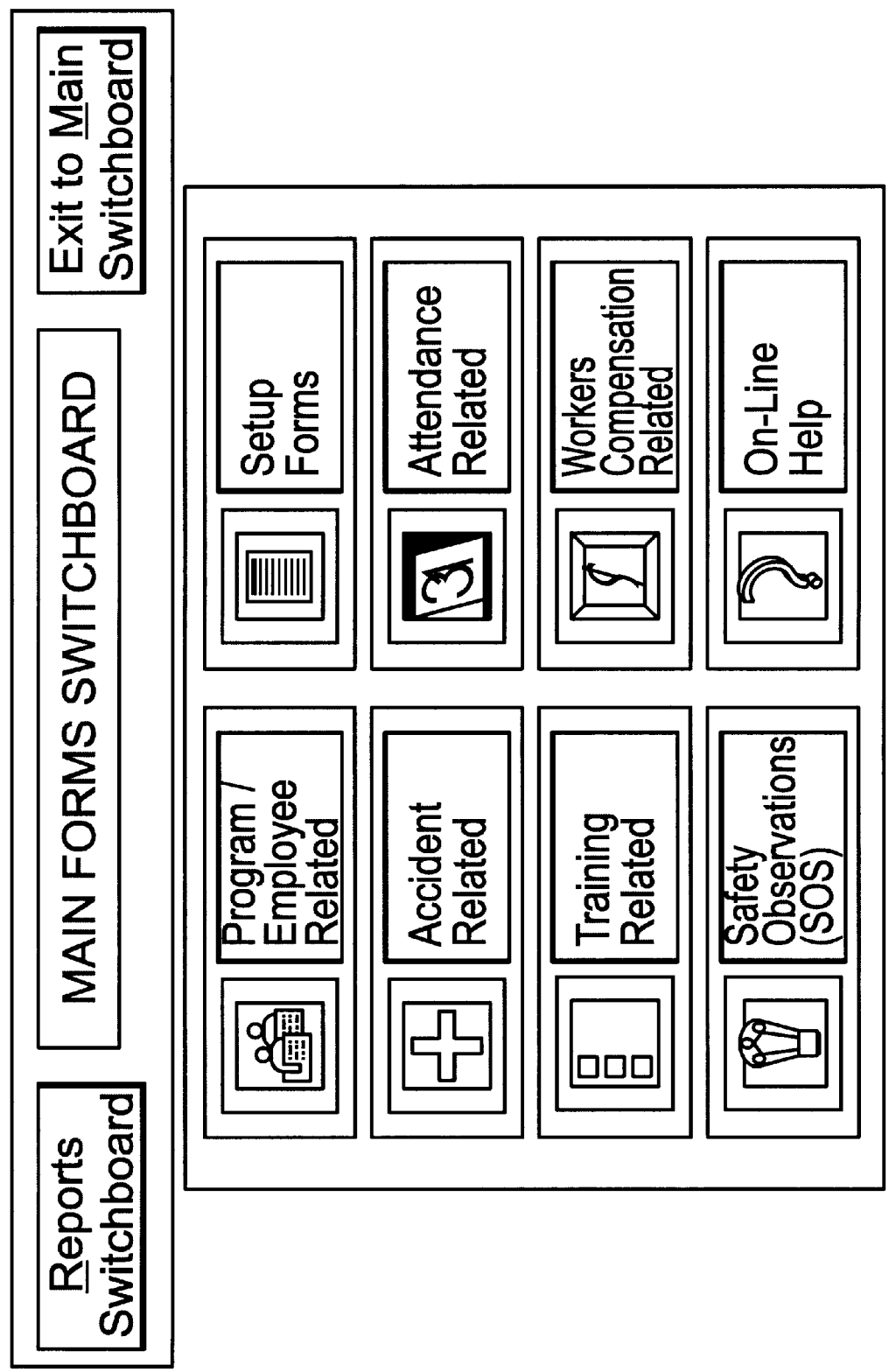
Figure 20:
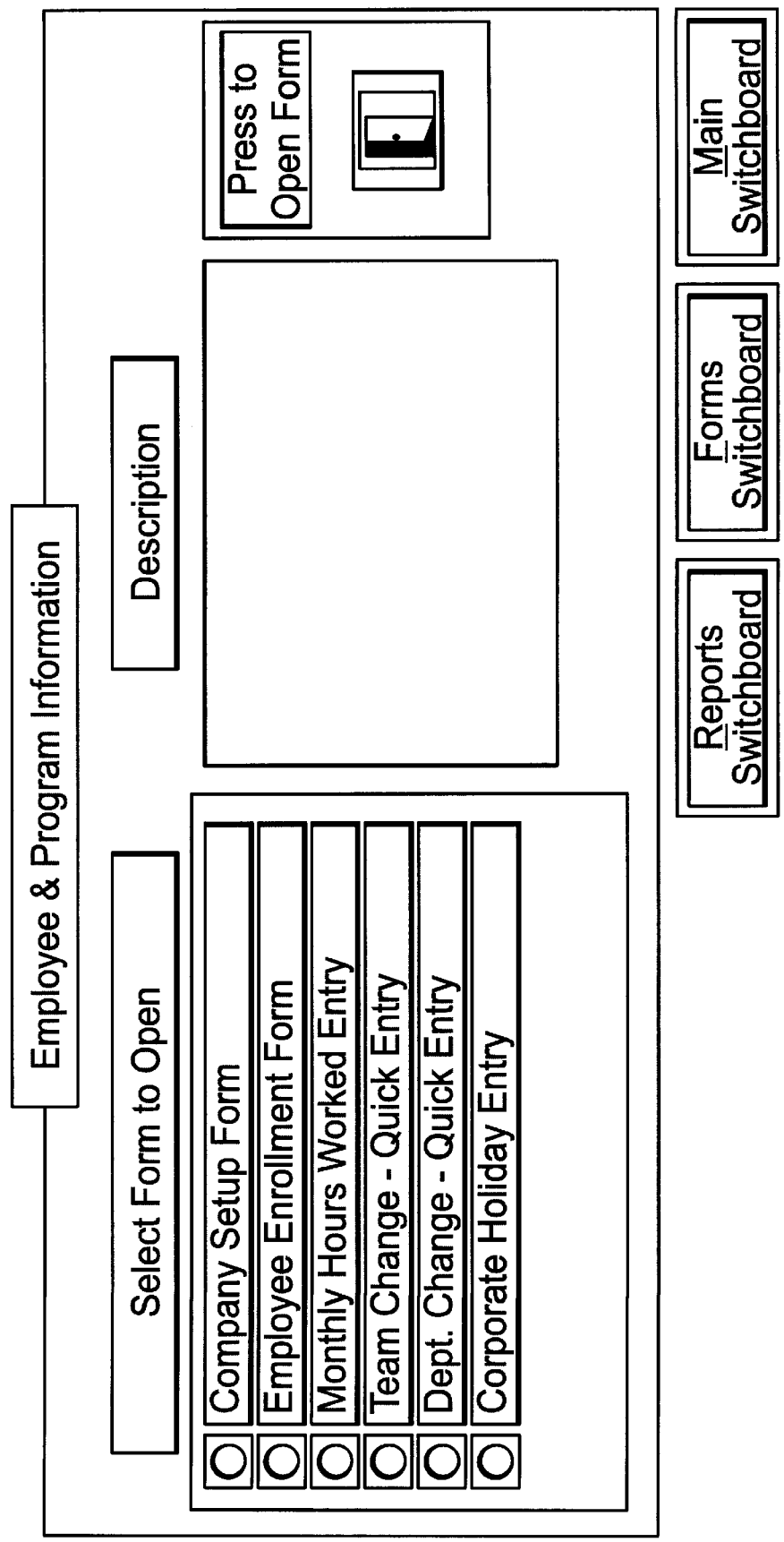
Figure 21:
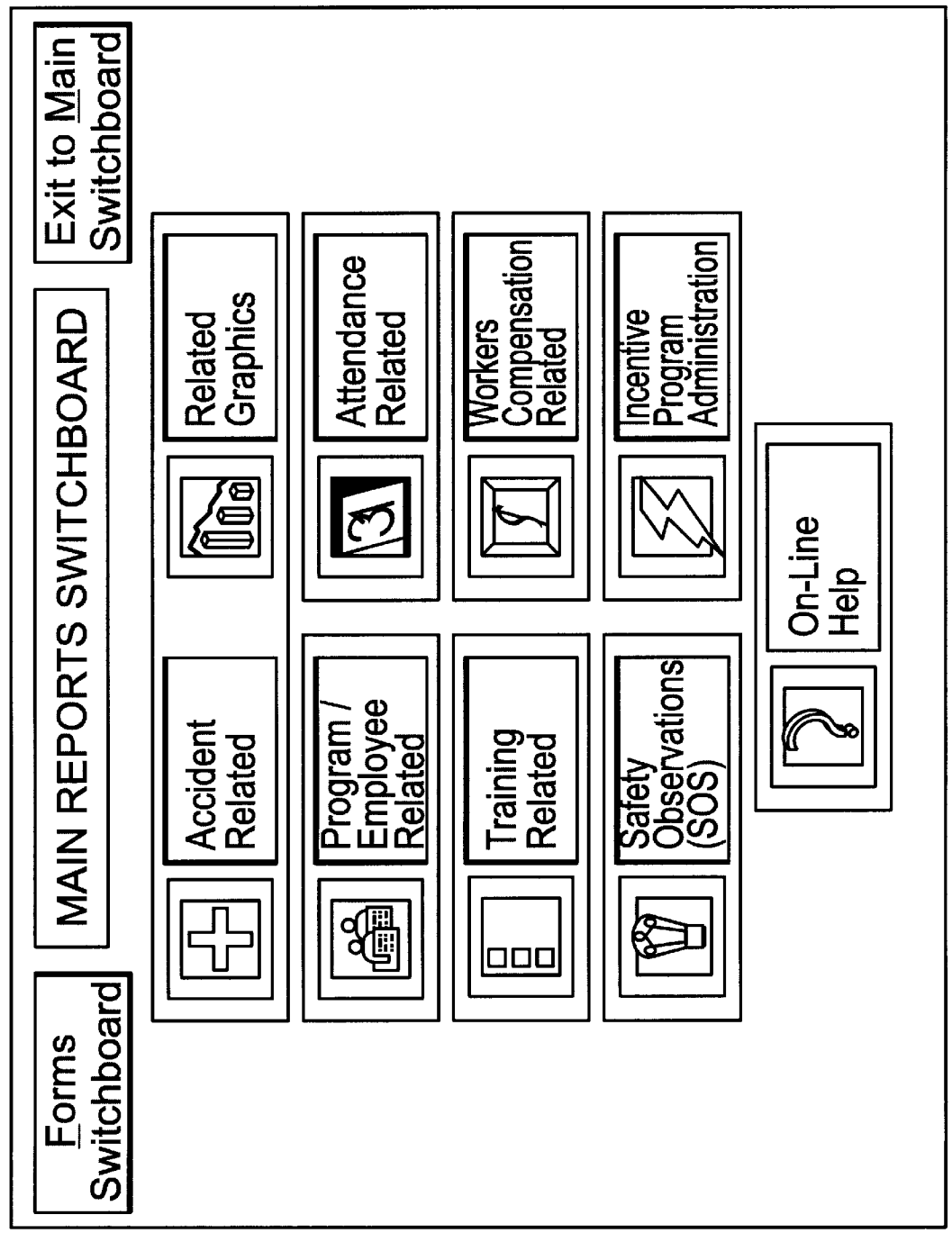
Figure 22:
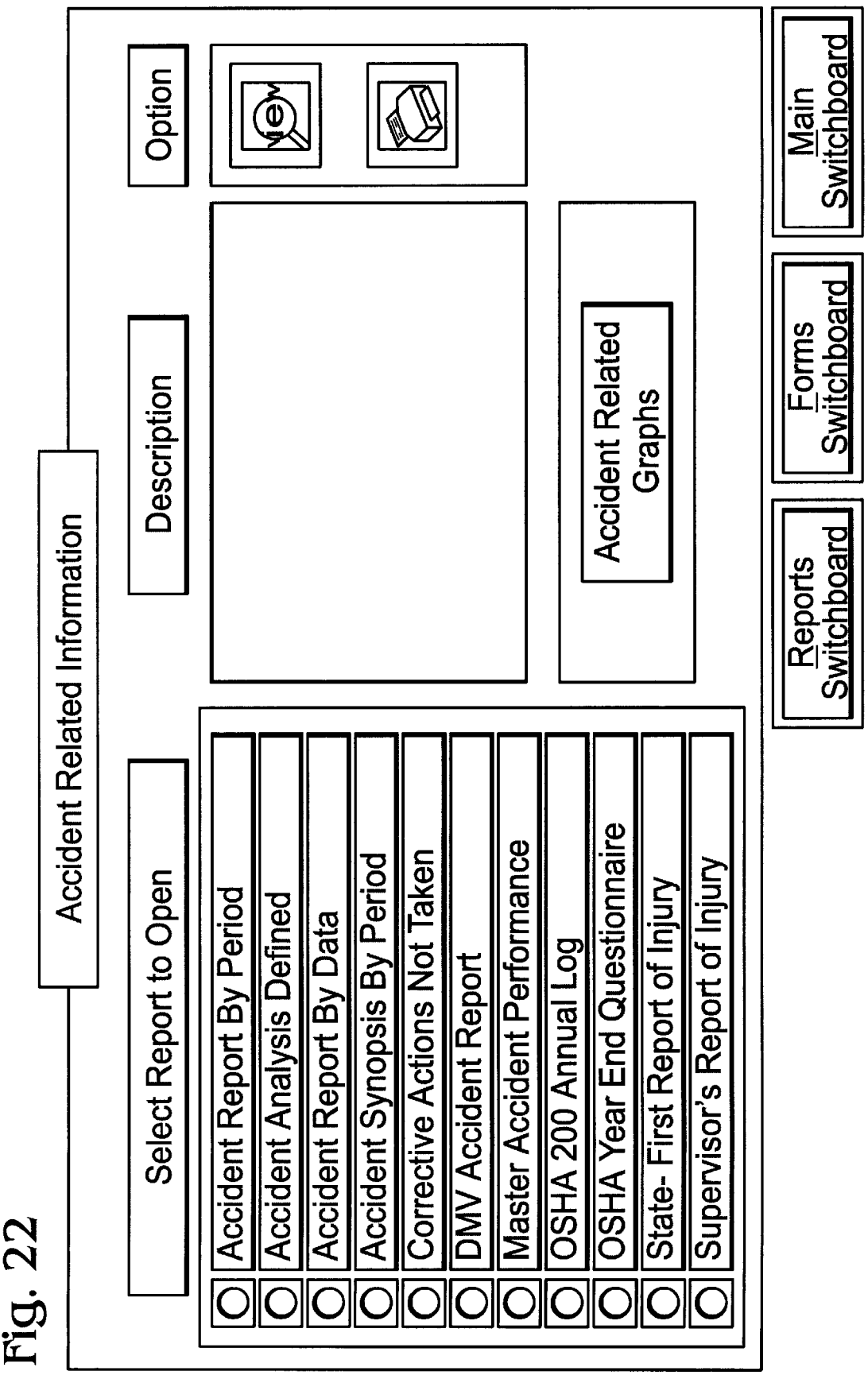
Figure 31:
Figures 37, 38:
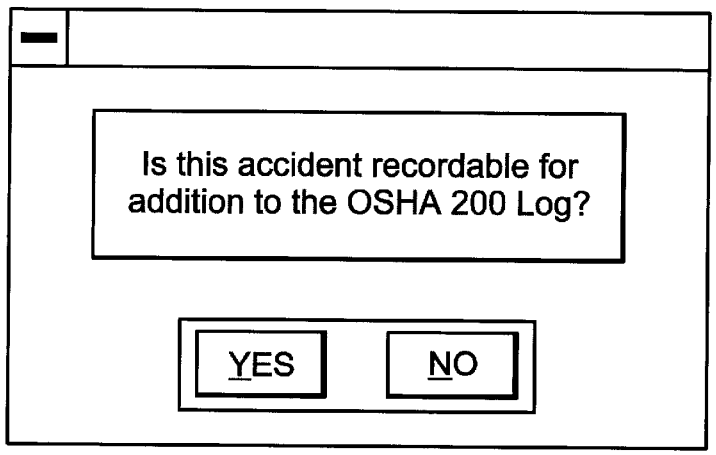
Figure 69:
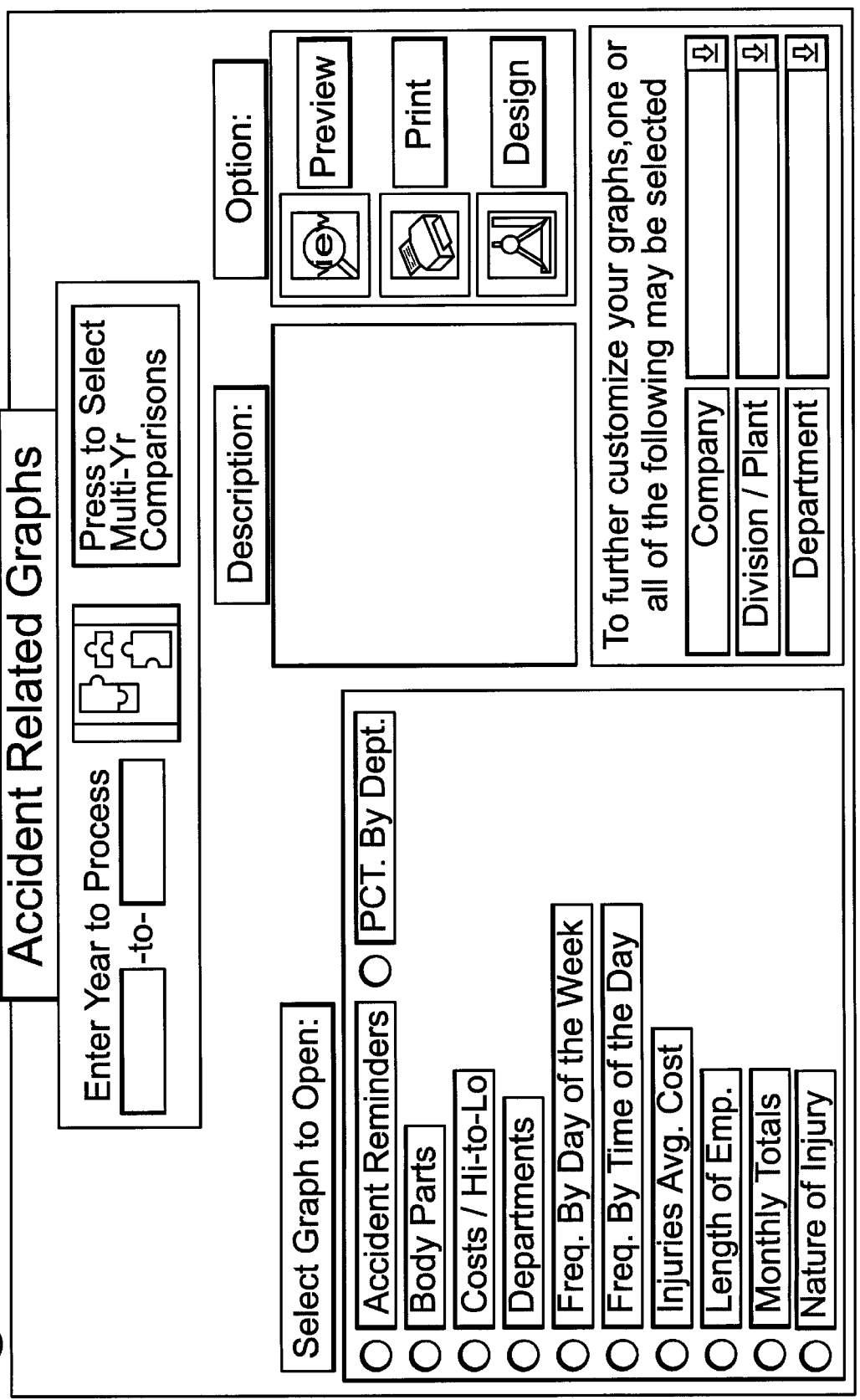

In FIGS. 5, 6 and 7, graphical reports are shown, with the graph being indicated generally at 66, a key being indicated at 68, and summary of the scope of the report being indicated at 70. In FIGS. 8, 9 and 10, textual reports are shown with text fields at 72 and with graphical status indicators at 74.

It will be appreciated that the overall database structure can be accomplished in many different forms. For example, each of the lists referred to in more detail below could be stored in a separate file in either mass data storage device 14 or RAM 16, or several or all of the lists could be accumulated into a single file in such devices. Furthermore, the files could be stored on a variety of different storage media, or even distributed about either a local area network or a wide area network. Thus, reference herein to a system database as opposed to an incident database could be reference to the same file/storage device 14/16, or an intertwined assemblage of files/storage devices 14/16, whether closely or loosely associated.

The use of "system" and "incident" identifiers for databases 52a and 52b is not as a description of a particular database structure, but as a description of the relationship of one type of list of records to another. The system database includes a plurality of defined lists of system records of selected variables and a plurality of defined report formats for producing selected incident reports. The selected variables define possible aspects of a given incident, such as the body part injured. By pre-defining the variables, completion of incident reports is standardized. For example, a human arm can also be referred to as an upper limb or an upper extremity, detailed to include the forearm, elbow and upper arm, or described using specific tissues or bones. If the list of body parts includes a record listing "ARM," then the user need only select this record, and need not deliberate as to whether the proper description would be one of the above-discussed alternatives. The selecting of a specific record also includes the automatic step of extracting the selected record from the system database for manipulation and/or use in a different record.

The incident database includes one or more defined lists of incident records of data, each incident record describing one or more aspects of a specific incident. Using the present invention, each incident record would normally contain one or more elements that were extracted and/or manipulated from the system database, as discussed above. Thus, each incident record would be standardized, regardless of who entered the information into the incident record.

The use of the system database to complete a record in the incident database also allows for the efficient creation of a more complete record. For example, when an incident occurs, all that may be known is the name of the injured worker and a simple description of what happened. By accessing the system database using that worker's name alone, additional information can be inserted automatically into the incident record, such as the worker's address, social security number, insurer, manager or special medical issues. Furthermore, the selection of a specific type of incident from a predefined list may automatically insert into the incident record a list of suggested corrective actions, follow-up procedures or reporting requirements. In addition, such selection might automatically generate a message for communication to a predefined list of other affected workers about the accident, and about how to avoid further accidents.

A further aspect of the present invention is to provide a direct comparison of the incident for which the user is viewing or modifying the information in the incident database to previously recorded incident records. For example, when a manager is inputting the initial information about an incident caused by constricted space, if there are other incidents already recorded in which constricted space was a contributing cause, the number of these similar, earlier incidents would be displayed on the incident input form. This immediate feedback is helpful in highlighting and identifying possible corrective steps to prevent the occurrence of yet further accidents.

In the preferred embodiment, the system/incident database(s) include at least the following lists of records: LIST OF DATABASES, INPUT FORMS, INPUT FORM DESCRIPTIONS, REPORT FORMATS, REPORT FORMAT DESCRIPTIONS, PARENTS/SUBSIDIARIES, COMPANY INFORMATION, INDUSTRY TYPES, LOCATIONS, OCCUPATIONS, DEPARTMENTS, SAFETY TEAMS, HOLIDAYS, EMPLOYEES, ATTENDANCE, ABSENCE CODES, HOSPITALS, ACCIDENTS, NATURE OF INJURY, BODY PARTS, INCIDENT TYPE, CONDITIONS, CAUSES, FED/STATE AGENCIES, AGENCY RECORDINGS, AWARENESS CODES, TRAINING CLASSES, TRAINING INTERVALS, TRAINING ROSTERS, TRAINING TESTS, TEST RESULTS and SAFETY REMINDERS.

The preferred data record structure of some of the lists of the system database are demonstrated by tables 1–3.

TABLE 1

List of Fields For Import/Export Purposes-Company Setup

| # Field Name | Description | Data Type |
|---|---|---|
| 1. Company Name | Company Name | Text |
| 2. Address #1 | Address 1 of Company | Text |
| 3. Address #2 | Address 2 of Company | Text |
| 4. City | Company City | Text |
| 5. State | Company State | Text |
| 6. Zip | Company Zip | Text |
| 7. County | Company County | Text |
| 8. Phone | Company Phone | Text |
| 9. Fed ID Number | Employer's FEIN | Number |
| 10. Plant/Location # | Company's Plant and Location No. | Text |
| 11. Primary Contact | Primary Contact w/Company | Text |
| 12. Secondary Contact | Second Company Contact | Text |
| 13. General Mgr or President | General Manager or President of Co. | Text |
| 14. General Nature of Business | General Nature of Business | Text |
| 15. Primary Hospital | Primary-Use Hospital for Co. | Text |

TABLE 1-continued

List of Fields For Import/Export Purposes-Company Setup

| # Field Name | Description | Data Type |
|---|---|---|
| 16. # Accidents To-Date | No. of Accidents To-Date | Number |
| 17. # Employees Enrolled To-Date | No. of Employees Enrolled To-Date | Number |
| 18. Avg Length of Employment | Average Length of Employment | Number |
| 19. State of Operatoin | State of Operation | Text |
| 20. Corp Type - Corporation | CB/Corporation Type of Corporation | Yes/No |
| 21. Corp Type - Partnership | CB/Partnership Type of Corporation | Yes/No |
| 22. Corp Type - Other | CB/Other Type of Corporation | Yes/No |
| 23. Ins Co | Insurance Co. Name | Text |
| 24. Ins Address1 | Insurance Co. Address1 | Text |
| 25. Ins Address2 | Insurance Co. Address2 | Text |
| 26. Ins City | Insurance Co. City | Text |
| 27. Ins State | Insurance Co. State | Text |
| 28. Ins Zip | Insurance Co. Zip | Text |
| 29. Ins Phone | Insurance Co. Phone | Text |
| 30. Ins Division1 | Insurance Co. Division1 | Text |
| 31. Ins Division2 | Insurance Co. Division2 | Text |
| 32. Ins Division3 | Insurance Co. Division3 | Text |
| 33. Co Logo | Company's Logo | OLE Object |

Note:
The file you are importing must include all of the above listed columns in the order and data types. If your file does not originally have all of these fields (which it probably won't), you will need to make a "SPACER" column for each one that is missing and insert them in the correct position. This "SPACER" function will be much easier if you are importing a spreadsheet file, than if you are importing an ASCII text file. Remember, even if your file is an ASCII text file, you can open that text file in Excel or Lotus and use the "Parse" function to separate the information into organized columns. Then import the completed files.

TABLE 2

List of Fields For Import/Export Purposes-Master Names

| # Field Name | Description | Data Type |
|---|---|---|
| 1. ID | Employee ID | Counter |
| 2. LAST | Employee's Last Name | Text |
| 3. FIRST | Employee's First Name | Text |
| 4. SSN | Employee's Social Security Number | Number |
| 5. Birthday | Employee's Date of Birth | Date/Time |
| 6. LOE | Employee's Length of Employment | Text |
| 7. ADJ | Employee's ADJ | Date/Time |
| 8. Address | Employee's Address | Text |
| 9. City | Employee's City | Text |
| 10. State | Employee's State | Text |
| 11. Zip | Employee's Zip | Number |
| 12. PHONE | Employee's Phone | Text |
| 13. DEPT | Employee's Department No. | Text |
| 14. Dept Name | Employee's Dept Name | Text |
| 15. Company | Company Name | Text |
| 16. Locale | Location of Company | Text |
| 17. HrlyRate | Employee Hourly Wage | Number |
| 18. Occupation | Employee's Occupation | Text |
| 19. TeamCode | Employee's Team Code | Text |
| 20. TeamName | Employee's Teamt Name | Text |

Note:
The file you are, importing must include all of the above listed columns in the order and data types. If your file does not originally have all of these fields (which it probably won't), you will need to make a "SPACER" column for each one that is missing and insert them in the correct position. This "SPACER" function will be much easier if you are importing a spreadsheet file, than if you are importing an ASCII text file. Remember, even if your file is an ASCII text file, you can open that text file in Excel or Lotus and use the "Parse" function to separate the information into organized columns. Then import the completed files.

TABLE 3

List of Fields For Import/Export Purposes-Injury Reminder

| # | Field Name | Description | Data Type |
|---|---|---|---|
| 1. | Accident Type | Type of Accident | Text |
| 2. | Reminder | Reminder of Accident | Memo |

Note:
The file you are importing must include all of the above listed columns in the order and data types. If your file does not originally have all of these fields (which it probably won't), you will need to make a "SPACER" column for each one that is missing and insert them in the correct position. This "SPACER" function will be much easier if you are importing a spreadsheet file, than if you are importing an ASCII text file. Remember, even if your file is an ASCII text file, you can open that text file in Excel or Lotus and use the "Parse" function to separate the information into organized columns. Then import the completed files.

The preferred data record structures of some of the lists of the incident database are demonstrated by tables 4–6.

TABLE 4

List of Fields For Import/Export Purposes-Accident Form

| # | Field Name | Description | Data Type |
|---|---|---|---|
| 1. | ID | Accident ID | Counter |
| 2. | Last | Employee Last Name | Text |
| 3. | First | Employee First Name | Text |
| 4. | Company | Company Name | Text |
| 5 | Locale | Co. Plant Location | Text |
| 6. | Department | Department Number | Text |
| 7. | Dept Name | Department Name | Text |
| 8. | Phone | Employee Phone Number | Text |
| 9. | DOB | Employee Date of Birth | Text |
| 10. | Sex Male | Check Box/Employee's Sex-Male | Yes/No |
| 11. | Sex Female | Check Box/Employee's Sex-Female | Yes/No |
| 12. | SSN | Employee Social Security Number | Text |
| 13. | Address | Employee Address | Text |
| 14. | City | Employee City | Text |
| 15. | State | Employee State | Text |
| 16. | Zip | Employee Zip | Number |
| 17. | LOE | Employee Length of Employment | Text |
| 18. | Hired | Date Employee Hired | Text |
| 19. | Hospitalized | Check Box/Was Employee Hospitalized | Yes/No |
| 20. | Hospital Name | Name of Hospital Emp. was taken to | Text |
| 21. | Date of Injury | Date Injury Occurred | Date/Time |
| 22. | Time of Injury | Time Injury Occurred | Date/Time |
| 23. | Time in Dept | Time Employee's been in Dept | Text |
| 24. | Name of Physician | Emp. Treating Physician | Text |
| 25. | Body Part | Part of Employee Body that was Injured | Text |
| 26. | Body Part - Left | Check Box/Left side of Emp. Body | Yes/No |
| 27. | Body Part - Right | Check Box/Right side of Emp. Body | Yes/No |
| 28. | Injured Previously | CB/Had Emp. Injured Body Part Before | Yes/No |
| 29. | Nature of Injury | Nature of Employee's Injury | Text |
| 30. | Cause | Cause of Employee's Injury | Text |
| 31. | Condition | Condition that Contributed to Injury | Text |
| 32. | Accident Type | What Type of Accident Caused Injury | Text |
| 33. | Accident Description | Description of the Accident | Memo |
| 34. | Corrective Action Taken | What Corrective Action Taken | Memo |
| 35. | Date Corrective Action Taken | Date the Corrective Action was Taken | Date/Time |
| 36. | Witness | Witness of the Accident | Text |
| 37. | Date Company Knew | Date that Company First Knew of Acc. | Date/Time |
| 38. | Street Address of Accident | Address Where Accident Occurred | Text |
| 39. | Nature of Business | Nature of Business | Text |
| 40. | County of Injury | County where Injury Occurred | Text |
| 41. | Emp Worker Status - Yes | Check Box - | Yes/No |
| 42. | Emp Worker Status - No | Check Box - | Yes/No |
| 43. | Emp Occupation | Occupation of Employee | Text |
| 44. | Length of Employment | Length of Time Emp. Worked for Co. | Date/Time |
| 45. | Injured on Premises - Yes | CB/Was Emp Injured on Premises - Yes | Yes/No |
| 46. | Injured on Premises - No | CB/Was Emp Injured on Premises - No | Yes/No |
| 47. | Fatality | CB/Was Accident a Fatality | Yes/No |
| 48. | Injured on Job - Yes | CB/Did Injury Occur on the Job - Yes | Yes/No |
| 49. | Injured on Job - No | CB/Did Injury Occur on the Job - No | Yes/No |
| 50. | Injured on Job - Unknown | CB/Injury Occur on the Job - Unknown | Yes/No |
| 51. | Other Workers Injured | CB/Were Other Workers Injured | Yes/No |
| 52. | Accident Result of Machine Failure | CB/Acc. a Result of Machine Failure | Yes/No |
| 53. | Accident Caused by Someone Else | CB/Acc. Caused by Someone Else | Yes/No |
| 54. | Company Accident Description | Company's Description of Accident | Memo |
| 55. | 801 OSHA To Be Filed? | CB/Is 801 OSHA to be Filed | Yes/No |
| 56. | Previous Injury Description | Description of Previous Injury | Text |
| 57. | Shift Start | Beginning of Employee's Shift | Date/Time |
| 58. | Shift End | End of Employee's Shift | Date/Time |
| 59. | Date Worker Left | Date Employee Left Work | Date/Time |
| 60. | Time Worker Left | Time Employee Left Work | Date/Time |
| 61. | Date Worker Returned | Date Worker Returned From Disability | Date/Time |
| 62. | Number Hrs Per Shift | Number Hrs Employee Works Per Shift | Number |
| 63. | Days Worked - 3 or less | CB/Emp. Reg. Works less then 3 days | Yes/No |
| 64. | Days Worked - 4 | CB/Emp. Reg. Works 4 days | Yes/No |
| 65. | Days Worked - 5 | CB/Emp. Reg. Works 5 days | Yes/No |
| 66. | Days Worked - 6 | CB/Emp. Reg. Works 6 days | Yes/No |
| 67. | Days Worked - 7 | CB/Emp. Reg. Works 7 days | Yes/No |
| 68. | Days Off - Sat | CB/Emp. Reg. Days Off - Sat | Yes/No |
| 69. | Days Off - Sun | CB/Emp. Reg. Days Off - Sun | Yes/No |
| 70. | Days Off - Mon | CB/Emp. Reg. Days Off - Mon | Yes/No |
| 71. | Days Off - Tue | CB/Emp. Reg. Days Off - Tue | Yes/No |
| 72. | Days Off - Wed | CB/Emp. Reg. Days Off - Wed | Yes/No |
| 73. | Days Off - Thurs | CB/Emp. Reg. Days Off - Thurs | Yes/No |
| 74. | Days Off - Fri | CB/Emp. Reg. Days Off - Fri | Yes/No |
| 75. | Wage | Employee's Current Wage | Number |
| 76. | Wage - Hr | CB/Emp. Wage Per Hour | Yes/No |
| 77. | Wage - Wk | CB/Emp. Wage Per Week | Yes/No |
| 78. | Wage - Day | CB/Emp. Wage Per Day | Yes/No |
| 79. | Wage - Mo | CB/Emp. Wage Per Month | Yes/No |
| 80. | Wage - Yr | CB/Emp. Wage Per Year | Yes/No |
| 81. | DirectMedical | Direct Medical Costs to Company | Currency |
| 82. | AdminCosts | Administration Costs to Company | Currency |
| 83. | EmpCompCosts | Employer Contribution | Currency |
| 84. | TotalCompCosts | Total Compensation Costs By Company | Currency |
| 85. | EstLongTermCosts | Estimated Long Term Costs | Currency |

TABLE 4-continued

List of Fields For Import/Export Purposes-Accident Form

| # | Field Name | Description | Data Type |
|---|---|---|---|
| | | to Company | |
| 86. | TeamCode | Team Code | Text |
| 87. | TeamName | Team Name | Text |

Note:
The file you are importing must include all of the above listed columns in the order and data types. If your file does not originally have all of these fields (which it probably won't), you will need to make a "SPACER" column for each one that is missing and insert them in the correct position. This "SPACER" function will be much easier if you are importing a spreadsheet file, than if you are importing an ASCII text file. Remember, even if your file is an ASCII text file, you can open that text file in Excel or Lotus and use the "Parse" function to separate the information into organized columns. Then import the completed files.

TABLE 5

List of Fields For Import/Export Purposes-OSHA AccExport

| # | Field Name | Description | Data Type |
|---|---|---|---|
| 1. | Last | Employee Last Name | Text |
| 2. | First | Employee First Name | Text |
| 3. | Name | Employee Name | Text |
| 4 | ID | Accident ID | Counter |
| 5. | Department | Department Number | Text |
| 6. | Dept Name | Department Name | Text |
| 7 | Phone | Employee Phone Number | Text |
| 8. | DOB | Employee Date of Birth | Text |
| 9. | Sex Male | Check Box/Employee's Sex-Male | Yes/No |
| 10. | Sex Female | Check Box/Employee's Sex-Female | Yes/No |
| 11. | SSN | Employee Social Security Number | Text |
| 12. | Address | Employee Address | Text |
| 13. | City | Employee City | Text |
| 14. | State | Employee State | Text |
| 15. | Zip | Employee Zip | Number |
| 16. | LOE | Employee Length of Employment | Text |
| 17. | Hired | Date Employee Hired | Text |
| 18. | Hospitalized | Check Box/Was Employee Hospitalized | Yes/No |
| 19. | Hospital Name | Name of Hospital Emp. was taken to | Text |
| 20. | Date of Injury | Date Injury Occurred | Date/Time |
| 21. | Month | Month | Text |
| 22. | Time of Injury | Time Injury Occurred | Date/Time |
| 23. | Time in Dept | Time Employee's been in Dept | Text |
| 24. | Name of Physician | Emp. Treating Physician | Text |
| 25. | Body Part | Part of Employee Body that was Injured | Text |
| 26. | Body Part - Left | Check Box/Left side of Emp. Body | Yes/No |
| 27. | Body Part - Right | Check Box/Right side of Emp. Body | Yes/No |
| 28. | Injured Previously | CB/Had Emp. Injured Body Part Before | Yes/No |
| 29. | Nature of Injury | Nature of Employee's Injury | Text |
| 30. | Cause | Cause of Employee's Injury | Text |
| 31. | Condition | Condition that Contributed to Injury | Text |
| 32. | Accident Type | What Type of Accident Caused Injury | Text |
| 33. | Accident Description | Description of the Accident | Memo |
| 34. | Corrective Action Taken | What Corrective Action Taken | Memo |
| 35. | Date Corrective Action Taken | Date the Corrective Action was Taken | Date/Time |
| 36. | Witness | Witness of the Accident | Text |
| 37. | Date Company Knew | Date that Company First Knew of Acc. | Date/Time |
| 38. | Street Address of Accident | Address Where Accident Occurred | Text |
| 39. | Nature of Business | Nature of Business | Text |
| 40. | County of Injury | County where Injury Occurred | Text |
| 41. | Emp Worker Status - Yes | Check Box - | Yes/No |
| 42. | Emp Worker Status - No | Check Box - | Yes/No |
| 43. | Emp Occupation | Occupation of Emplooyee | Text |
| 44. | Length of Employment | Length of Time Emp. Worked for Co. | Date/Time |
| 45. | Injured on Premises - Yes | CB/Was Emp Injured on Premises - Yes | Yes/No |
| 46. | Injured on Premises - No | CB/Was Emp Injured on Premises - No | Yes/No |
| 47. | Fatality | CB/Was Accident a Fatality | Yes/No |
| 48. | Injured on Job - Yes | CB/Did Injury Occur on the Job - Yes | Yes/No |
| 49. | Injured on Job - No | CB/Did injury Occur on the Job - No | Yes/No |
| 50. | Injured on Job - Unknown | CB/Injury Occur on the Job - Unknown | Yes/No |
| 51. | Other Workers Injured | CB/Were Other Workers Injured | Yes/No |
| 52. | Accident Result of Machine Failure | CB/Acc. a Result of Machine Failure | Yes/No |
| 53. | Accident Caused by Someone Else | CB/Acc. Caused by Someone Else | Yes/No |
| 54. | Company Accident Description | Company's Description of Accident | Memo |
| 55. | 801 OSHA To Be Filed? | CB/Is 801 OSHA to be Filed | Yes/No |
| 56. | Previous Injury Description | Description of Previous Injury | Text |
| 57. | Shift Start | Beginning of Employee's Shift | Date/Time |
| 58. | Shift End | End of Employee's Shift | Date/Time |
| 59. | Date Worker Left | Date Employee Left Work | Date/Time |
| 60. | Time Worker Left | Time Employee Left Work | Date/Time |
| 61. | Date Worker Returned | Date Worker Returned From Disability | Date/Time |
| 62. | Number Hrs Per Shift | Number Hrs Employee Works Per Shift | Number |
| 63. | Days Worked - 3 or less | CB/Emp. Reg. Works less then 3 days | Yes/No |
| 64. | Days Worked - 4 | CB/Emp. Reg. Works 4 days | Yes/No |
| 65. | Days Worked - 5 | CB/Emp. Reg. Works 5 days | Yes/No |
| 66. | Days Worked - 6 | CB/Emp. Reg. Works 6 days | Yes/No |
| 67. | Days Worked - 7 | CB/Emp. Reg. Works 7 days | Yes/No |
| 68. | Days Off - Sat | CB/Emp. Reg. Days Off - Sat | Yes/No |
| 69. | Days Off - Sun | CB/Emp. Reg. Days Off - Sun | Yes/No |
| 70. | Days Off - Mon | CB/Emp. Reg. Days Off - Mon | Yes/No |
| 71. | Days Off - Tue | CB/Emp. Reg. Days Off - Tue | Yes/No |
| 72. | Days Off - Wed | CB/Emp. Reg. Days Off - Wed | Yes/No |
| 73. | Days Off - Thurs | CB/Emp. Reg. Days Off - Thurs | Yes/No |
| 74. | Days Off - Fri | CB/Emp. Reg. Days Off - Fri | Yes/No |
| 75. | Wage | Employee's Current Wage | Number |
| 76. | Wage - Hr | CB/Emp. Wage Per Hour | Yes/No |
| 77. | Wage - Wk | CB/Emp. Wage Per Week | Yes/No |
| 78. | Wage - Day | CB/Emp. Wage Per Day | Yes/No |
| 79. | Wage - Mo | CB/Emp. Wage Per Month | Yes/No |
| 80. | Wage - Yr | CB/Emp. Wage Per Year | Yes/No |
| 81. | DirectMedical | Direct Medical Costs to Company | Currency |
| 82. | EmpCompCosts | Employer Contribution | Currency |
| 83. | EstLongTermCosts | Estimated Long Term Costs to Company | Currency |
| 84. | TotalCompCosts | Total Compensation Costs By Company | Currency |
| 85. | AdminCosts | Administration Costs to Company | Currency |
| 86. | Locale | Co. Plant Location | Text |

TABLE 5-continued

List of Fields For Import/Export Purposes-OSHA AccExport

| # | Field Name | Description | Data Type |
|---|---|---|---|
| 87. | Company | Company Name | Text |
| 88. | TeamCode | Team Code | Text |
| 89. | TeamName | Team Name | Text |

Note:
The file you are importing must include all of the above listed columns in the order and data types. If your file does not originally have all of these fields (which it probably won't), you will need to make a "SPACER" column for each one that is missing and insert them in the correct position. This "SPACER" function will be much easier if you are importing a spreadsheet file, than if you are importing an ASCII text file. Remember, even if your file is an ASCII text file, you can open that text file in Excel or Lotus and use the "Parse" function to separate the information into organized columns. Then import the completed files.

TABLE 6

List of Fields For Import/Export Purposes-SOS Form Data

| # | Field Name | Description | Data Type |
|---|---|---|---|
| 1. | ReportID | Report ID | Text |
| 2. | IncidentID | Incident ID (Auto Counter) | Counter |
| 3. | Last | Last Name | Text |
| 4. | First | First Name | Text |
| 5. | AffectedPerson | Affected Person | Text |
| 6. | WeyerEmp | Is this an Employee? | Yes/No |
| 7. | NonEmp | Is this a Non-Employee | Yes/No |
| 8. | Company | Company Name | Text |
| 9. | Locale | Plant/Location # | Text |
| 10. | Department | Employee Department Code | Text |
| 11. | Dept Name | Employee Department Name | Text |
| 12. | MailStop | Employee Mail Stop | Text |
| 13. | ReportType | Report Type | Text |
| 14. | DOB | Date of Birth | Text |
| 15. | Sex Male | Is the employee Male? | Yes/No |
| 16. | Sex Female | Is the employee Female? | Yes/No |
| 17. | SSN | Social Security Number | Text |
| 18. | Address | Date Employee Hired | Text |
| 19. | City | Check Box/Was Employee Hospitalized | Text |
| 20. | State | Name of Hospital Emp. was taken to | Text |
| 21. | Zip | Date Injury Occurred | Text |
| 22. | LOE | Time Injury Occurred | Number |
| 23. | Hired | Time Employee's been in Dept | Text |
| 24. | DateOfIncident | Emp. Treating Physician | Date/Time |
| 25. | Time of Incident | Part of Employee Body that was Injured | Date/Time |
| 26. | Time in Dept | Check Box/Left side of Emp. Body | Date/Time |
| 27. | Location | Check Box/Right side of Emp. Body | Text |
| 28. | Nature of Injury | CB/Had Emp. Injured Body Part Before | Text |
| 29. | IncidentType | Nature of Employee's Injury | Text |
| 30. | IncidentCode | Cause of Employee's Injury | Text |
| 31. | InjuryCode | Condition that Contributed to Injury | Text |
| 32. | Cause | What Type of Accident Caused Injury | Text |
| 33. | Condition | Description of the Accident | Text |
| 34. | ConditionCode | What Corrective Action Taken | Text |
| 35. | Accident Type | Date the Corrective Action was Taken | Text |
| 36. | Accident Description | Witness of the Accident | Text |
| 37. | Corrective ActionTaken | Date that Company First Knew of Acc. | Memo |
| 38. | Corrective ActionDescription | Address Where Accident Occurred | Yes/No |
| 39. | DateCorrectiveActionTaken | Nature of Business | Memo |
| 40. | Witness | County where Injury Occurred | Date/Time |
| 41. | DateReceived | Check Box - | Date/Time |
| 42. | DateReplied | Check Box - | Date/Time |
| 43. | ProjectedCompleteDate | Occupation of Emplooyee | Date/Time |
| 44. | DateCompleted | Length of Time Emp. Worked for Co. | Text |
| 45. | AcknowledgedBy | CB/Was Emp Injured on Premises - Yes | Memo |
| 46. | AcknowledgeNotes | CB/Was Emp Injured on Premises - No | Yes/No |
| 47. | Response-Yes/Completed | CB/Was Accident a Fatality | Yes/No |
| 48. | Response-Yes/TBI | CB/Did Injury Occur on the Job - Yes | Yes/No |
| 49. | Response-Pending | CB/Did Injury Occur on the Job - No | Yes/No |
| 50. | Response-No | CB/Injury Occur on the Job - Unknown | Yes/No |
| 51. | Response-Other | CB/Were Other Workers Injured | Yes/No |
| 52. | SupervisorInvolved | CB/Acc. a Result of Machine Failure | Text |
| 53. | SupervisorName | CB/Acc. Caused by Someone Else | Yes/No |
| 54. | FurtherActionNeeded | Company's Description of Accident | Memo |
| 55. | FurtherActionSugg | CB/Is 801 OSHA to be Filed | Text |
| 56. | InvestigationAssignedTo | Description of Previous Injury | Text |
| 57. | IncidentLocation | Beginning of Employee's Shift | Text |
| 58. | PreventativeAction | End of Employee's Shift | Text |
| 59. | RecommendedActionDate | Date Employee Left Work | Date/Time |
| 60. | ActualActionApproved | Time Employee Left Work | Memo |
| 61. | CorrectiveActionAssigned | Date Worker Returned From Disability | Text |
| 62. | WorkOrderNo | Number Hrs Employee Works Per Shift | Number |

It will be appreciated that the physical data structure in storage device 14 or RAM may take any suitable form, such as inline or multidimensional arrays, indexed arrays, or indexed tables.

To better explain the system and methods of the present invention, the operating instructions of a preferred embodiment of the invention are incorporated below:

Given the above description of the present invention, it can be seen that it includes a data flow as shown in FIG. 11. Specifically, a system database creator/modifier 76 operates on system database 52*a* to create or modify system database 52*a*. Creator/modifier 76 includes an input form selector 78 that accesses database 52*a* and, through VDT 20 and keyboard 22/display cursor control system 24, allows the user to select an input form for display on VDT 20. Once such an input form is selected by selector 78, an input form formatter 80, operating in digital processor 12, formats the selected form for display on VDT 20. The selected is then displayed on VDT 20, and a system record editor 82, through keyboard 22 and display cursor control systems 24, allows a user to select specific records for viewing and editing through the selected form, and input new records using the selected form.

An incident database creator/modifier is shown at 84, again operating through digital processor 12. A system record extractor 86 extracts predefined records from system database 52*a*, after which a system information extractor 88, operating through VDT 20, keyboard 22 and/or display cursor control system 24, extracts predefined information from the selected records, and allows the user to specify specific information for extraction. An incident record selector 90 operates on incident database 52*b*, either before, while or after the system records and information are extracted at 86 and 88, to select a specific incident record for viewing or modification or creation. This viewing, modification or creation is performed by an incident record editor 92, operating through digital processor 12, RAM 16, VDT 20, keyboard 22 and/or display cursor control system 24. Once the selected incident records are edited, the information is rewritten to incident database 52*b*.

A report generator is shown at 94, again operating through digital processor 12. Generator 94 includes a report format selector 96 that accesses system database 52*a*, and through VDT 20, keyboard 22 and/or display cursor control system 24, allows a user to select a defined report format. Once the report format is selected, a report formatter 98 accesses and extracts information specified in the selected format from database 52, including system database 52*a* and incident database 52*b*, and manipulates the information to create a completed report. The completed report is then produced through a computer output medium at 100, such as a printer.

From the forgoing identification of the components of the present invention, the following methods and systems are included within the scope of the invention.

A computer-implemented process of reporting safety information stored in computer memory is controlled by one or more user workstations 10. The process includes the step of creating a system database 52*a* stored in computer memory 14/16, database 52*a* including a plurality of defined lists of entries for selected variables and a plurality of defined formats for selected reports. The defined lists include information such as a defined list of employees and a defined list of types of incidents. The defined formats include reports such as OSHA report 200 and DMV (Department of Motor Vehicles) accident reports.

The process also includes the step of creating an incident database 52*b* stored in computer memory 14/16 by selecting an record from one or more of the defined lists in system database 52*a* and inserting the selected entry or entries into a data record. This step can include or be concurrent with the steps of accessing previously created incident records, selecting ones of such records to match information inserted into the current incident record, and displaying on the selected form information comparing the current record to the selected ones of the previously created records.

The process further includes the step of creating an incident report by selecting one of the defined formats from system database 52*a*, extracting and manipulating information from incident database 52*b* as defined in the selected format from system database 52*a*, and producing the report on a computer output medium such as VDT 20.

Viewed somewhat differently, the invention includes a computer-assisted process of reporting safety information stored in computer memory. This process includes the step of creating a company database stored in computer memory 14/16. The company database includes a defined list of employees and a defined list of types of incidents. The process also includes the steps of selecting an employee from the company database, selecting a type of incident from the company database, and creating an incident database stored in computer memory by inserting the selected employee and type of incident into a data record. The process next includes the steps of formatting the incident database into a report and producing the report on a computer output medium.

Viewed still differently, the invention includes a computer-aided process of producing incident reports, the process comprising the step of creating a system database 52*a* stored in computer memory 14/16. System database 52*a* includes a plurality of defined lists of entries for selected variables and a plurality of defined formats for selected incident reports. The process further comprises the step of creating, an incident database 52*b* stored in computer memory 14/16 by selecting an entry from one or more of the defined lists in system database 52*a*, and inserting the selected entry or entries into a data record. The process further comprises the step of creating an incident report, by selecting one of the defined formats from system database 52*a*, extracting and manipulating information from incident database 52*b* as defined in the selected format, and producing the report on a computer output medium.

Described differently, the invention includes an incident reporting system 10. The reporting system comprises a system database 52*a* stored in computer memory 14/16, including a plurality of defined lists of system records of selected variables, and a plurality of defined report formats for producing selected incident reports. A system record selector 86 is provided for selecting one or more of the defined system records, and an information extractor 88 is provided for extracting one or more elements from the selected system record.

The reporting system 10 further comprises an incident database 52*b* stored in computer memory 14/16, including one or more defined lists of incident records of data. Each incident record describes one or more aspect of a specific incident, and may contain one or more of the extracted elements from system database 52*a*. A report format selector 96 is provided for selecting one or more of the defined report formats, and a report formatter 98 is provided for extracting and manipulating information from incident database 52*b* as defined in the selected report format. The reporting system 10 further comprises a computer output medium through which the extracted and manipulated information is produced in the selected report format.

Reporting system 10 further comprises an input form database 52*a*2/52*b*2 including a plurality of defined input forms for prompting a user for input to system/incident database 52. An input form selector 78 is provided for selecting one or more of the defined input forms, and an input form formatter 80 is provided for extracting and manipulating information from system database 52*a* as defined in the selected input form. A user interface is provided for displaying the selected input form and allowing a user to input information into one or more records of one or more lists of system database 52*a* through the selected input form.

INDUSTRIAL APPLICABILITY

The present invention is particularly applicable to the administration and support of the industry process known as light duty/restricted duty/recurrence of injury recording, analysis and reporting.

I claim:

1. A computer-implemented process of reporting injured-worker safety information, comprising the steps of:

creating a system database stored in computer memory, the system database including a plurality of defined lists of entries for selected injured-worker-related items including information necessary to comply with governmental injured-worker-reporting regulations, and a plurality of defined formats for selected injured-worker incident reports including an OSHA 200 report;

creating an injured-worker incident database stored in computer memory by selecting an entry from one or more of the defined lists in the system database, and inserting the selected entry or entries into a data record; and creating an injured-worker incident report that includes regulatory-required injured-worker information by:
selecting one of the defined formats from the system database;
extracting and manipulating information from the incident database as defined in the selected format; and
producing the report on a computer output medium.

2. The computer-implemented process according to claim 1, wherein the defined lists include a defined list of employees.

3. The computer-implemented process according to claim 1, wherein the defined lists include a defined list of types of injured-worker incidents.

4. The computer-implemented process according to claim 1, wherein the defined formats include a Department of Motor Vehicles accident report.

5. The computer-implemented process according to claim 1, further comprising the steps of:
accessing previously created incident records;
selecting one of the previously created incident records to match information inserted into the incident record being created; and
displaying on the selected format information comparing the current incident record to the selected previously created incident record.

6. A computer-implemented process of reporting injured-worker safety information, comprising the steps of:
creating a system database stored in computer memory, the system database including a plurality of defined lists of entries for selected injured-worker-related items including worker name and information necessary to comply with governmental injured-worker-reporting regulations, and further including a plurality of defined formats for selected injured-worker incident reports, where the plurality of defined formats includes an OSHA 200 report, and where the system database is searchable by worker name;

creating an injured-worker incident database stored in computer memory by selecting an entry from one or more of the defined lists in the system database, and inserting the selected entry or entries into a data record; and creating an injured-worker incident report that includes regulatory-required injured-worker information by:
selecting one of the defined formats from the system database;
extracting and manipulating information from the incident database as defined in the selected format; and
producing the report on a computer output medium.

7. A computer-implemented process of reporting injured-worker safety information, comprising the steps of:
creating a system database stored in computer memory, the system database including a plurality of defined lists of entries for selected injured-worker-related items including information necessary to comply with governmental injured-worker-reporting regulations, and further including an OSHA 200 report format, and a plurality of defined graphical report formats for producing injured-worker information regarding a plurality of workers;

creating an injured-worker incident database stored in computer memory by selecting an entry from one or more of the defined lists in the system database, and inserting the selected entry or entries into a data record; and creating a graphical report that includes regulatory-required injured-worker information regarding a plurality of workers by:
selecting one of the defined graphical report formats from the system database;
extracting and manipulating information from the incident database as defined in the selected graphical format; and
producing the graphical report on a computer output medium.

* * * * *